US011581775B2

(12) United States Patent
Walisko et al.

(10) Patent No.: US 11,581,775 B2
(45) Date of Patent: Feb. 14, 2023

(54) DEVICE FOR DRIVING A COMPRESSOR WITH AN INSULATION ARRANGEMENT

(71) Applicant: Hanon Systems, Daejeon (KR)

(72) Inventors: David Walisko, Hürth (DE); Frank Mau, Aachen (DE); Johannes Stausberg, Cologne (DE)

(73) Assignee: HANON SYSTEMS, Daejeon (KR)

(*) Notice: Subject to any disclaimer, the term of this patent is extended or adjusted under 35 U.S.C. 154(b) by 444 days.

(21) Appl. No.: 16/872,455

(22) Filed: May 12, 2020

(65) Prior Publication Data
US 2020/0366149 A1 Nov. 19, 2020

(30) Foreign Application Priority Data

May 14, 2019 (DE) .......................... 102019112534.0
May 14, 2019 (DE) .......................... 102019112541.3

(51) Int. Cl.
H02K 3/34 (2006.01)
H02K 1/16 (2006.01)
H02K 9/10 (2006.01)

(52) U.S. Cl.
CPC ............ H02K 3/345 (2013.01); H02K 1/165 (2013.01); H02K 9/10 (2013.01)

(58) Field of Classification Search
CPC ............ H02K 1/16; H02K 1/165; H02K 3/34; H02K 3/345; H02K 9/10
USPC ............................. 310/215, 216.105, 216.115
See application file for complete search history.

(56) References Cited

U.S. PATENT DOCUMENTS

| 2002/0074871 A1 | 6/2002 | Kikuchi et al. |
| 2012/0175977 A1 | 7/2012 | Beatty et al. |
| 2013/0313939 A1 | 11/2013 | Hiramitsu |
| 2014/0175935 A1 | 6/2014 | Tsuchiya et al. |

(Continued)

FOREIGN PATENT DOCUMENTS

| DE | 60117084 T2 | 7/2006 |
| DE | 60221614 T2 | 11/2007 |

(Continued)

OTHER PUBLICATIONS

Hiriyama et al., English Machine Translation of 2005133585 (Year: 2005).*

(Continued)

Primary Examiner — Rashad H Johnson
(74) Attorney, Agent, or Firm — Shumaker, Loop & Kendrick, LLP; James D. Miller

(57) ABSTRACT

An electric motor having has a rotor and a stator with a stator core as well as an insulation assembly, which extend along a common longitudinal axis from a first end face to a second end face of the stator. The stator core is formed with bars arranged uniformly distributed on the circumference to accommodate conducting wires wound into coils. The insulation assembly has a first insulation element, second insulation elements, and a third insulation element. The first insulation element is arranged between conducting wires and the stator core; a respective second insulation element is arranged in an intermediate space formed between coils arranged to fit closely to one another; and the third insulation element is arranged on an inner side of the stator, the inner side pointing inward in the radial direction, in a manner so as to seal the inner side.

22 Claims, 14 Drawing Sheets

(56) References Cited

U.S. PATENT DOCUMENTS

| | | | |
|---|---|---|---|
| 2015/0022050 A1 | 1/2015 | Sawada et al. | |
| 2016/0164362 A1* | 6/2016 | Lehner | H02K 3/38 |
| | | | 29/605 |
| 2017/0063189 A1 | 3/2017 | Yang | |
| 2020/0366150 A1* | 11/2020 | Walisko | H02K 3/24 |
| 2020/0366173 A1* | 11/2020 | Walisko | H02K 3/34 |
| 2021/0044160 A1* | 2/2021 | Leiber | H02K 3/345 |

FOREIGN PATENT DOCUMENTS

| | | |
|---|---|---|
| DE | 102006048967 A1 | 4/2008 |
| DE | 102010031194 A1 | 2/2011 |
| DE | 102010060859 A1 | 5/2012 |
| DE | 102018118465 A1 | 2/2019 |
| EP | 1322021 A1 | 6/2003 |
| EP | 1947755 A1 | 7/2008 |
| JP | 2002112488 A | 4/2002 |
| JP | 2004072899 A | 3/2004 |
| JP | 2005133585 A | 5/2005 |
| JP | 2006320136 A | 11/2006 |
| JP | 2008042959 A | 2/2008 |
| JP | 2011072128 A | 4/2011 |
| JP | 2016200122 A | 12/2016 |
| WO | 2010034579 A2 | 4/2010 |
| WO | 2015146677 A1 | 10/2015 |
| WO | 2018083916 A1 | 5/2018 |

OTHER PUBLICATIONS

Ota et al., English Machine Translation of JP 2004072899 (Year: 2004).*

Takano et al., English Machine Translation of JP 2016200122 (Year: 2016).*

* cited by examiner

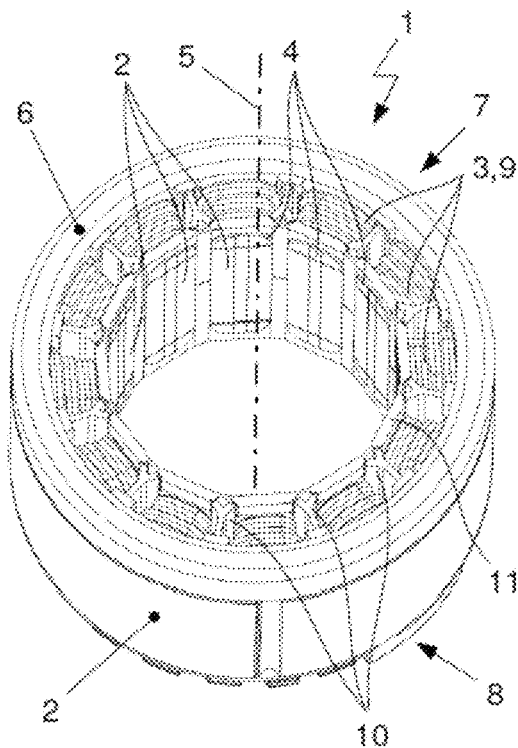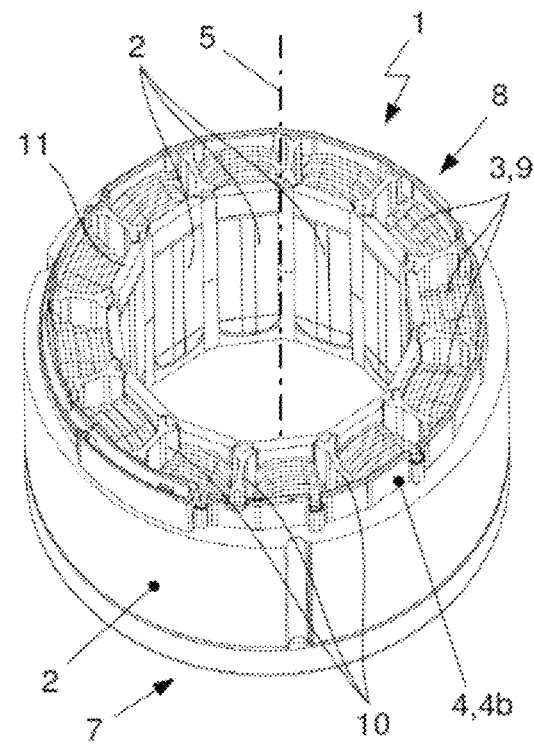
Fig. 1A                    Fig. 1B
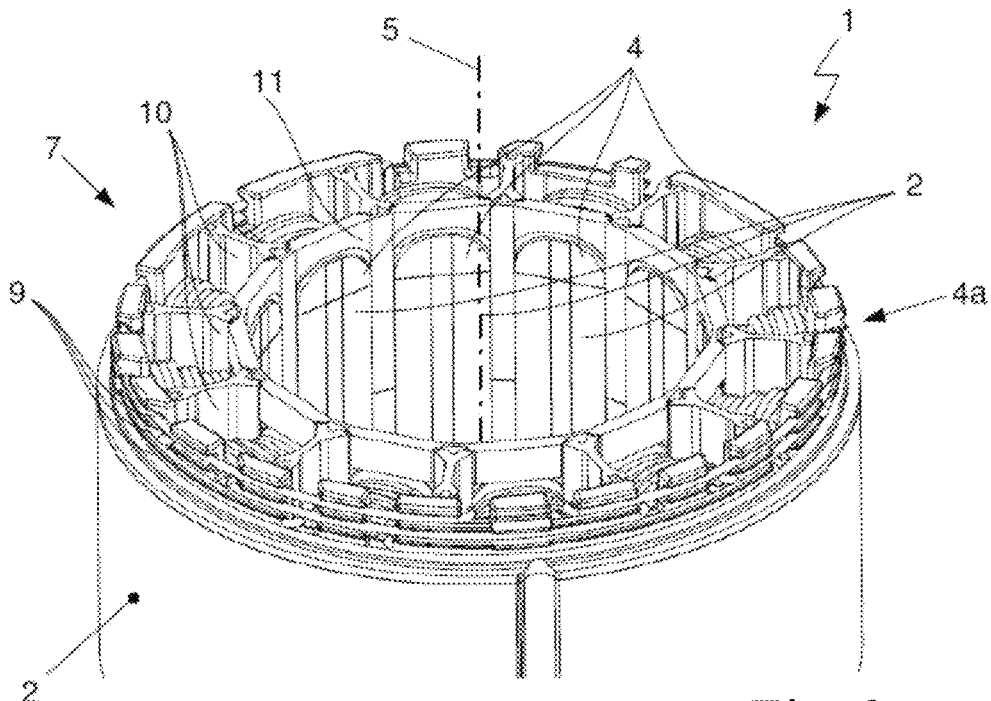
Fig. 2

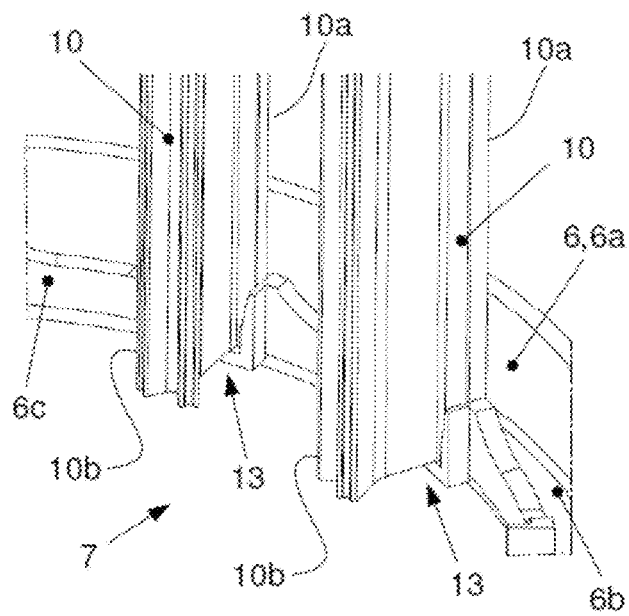
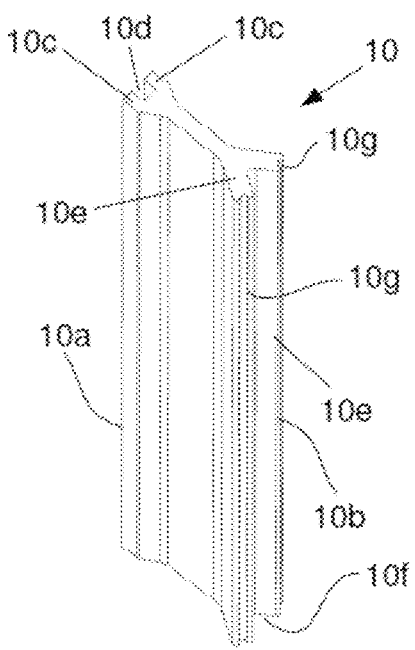
Fig. 5
Fig. 6
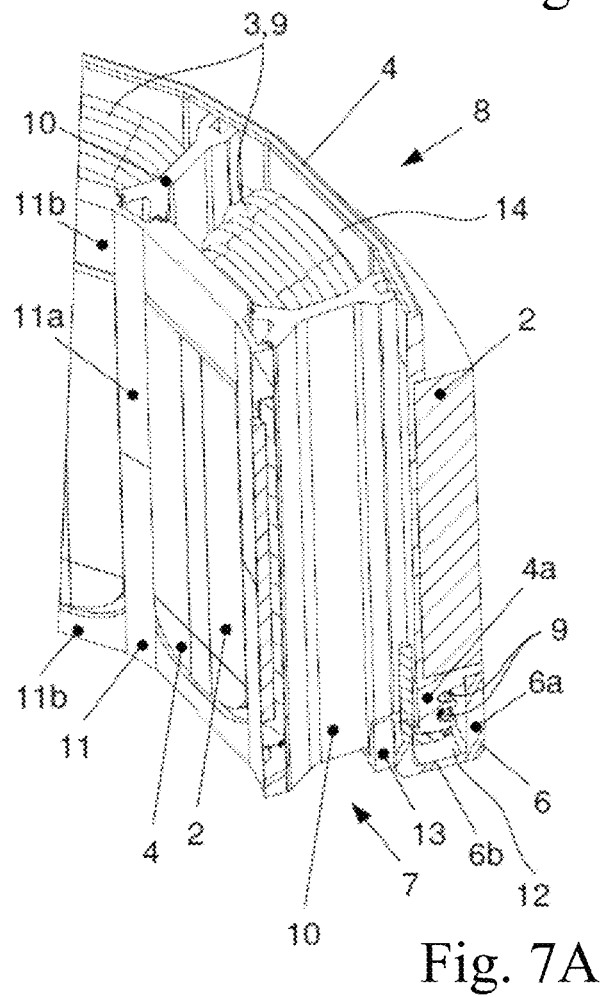
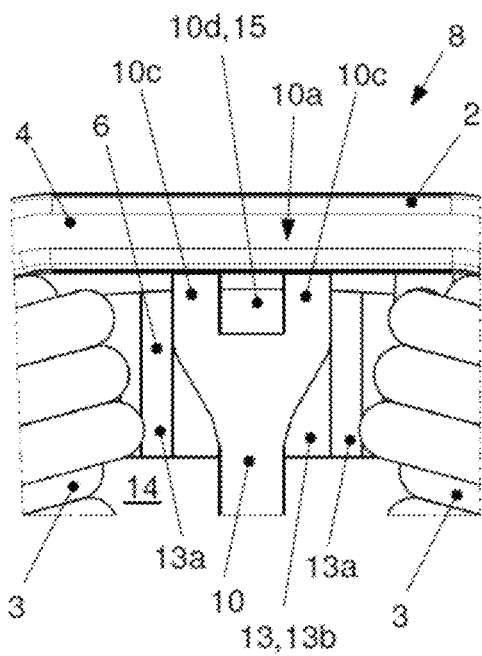
Fig. 7A
Fig. 7B

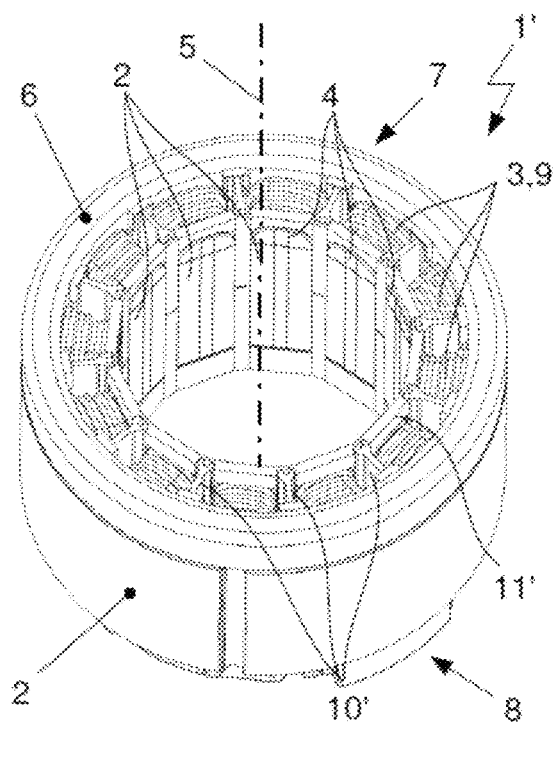
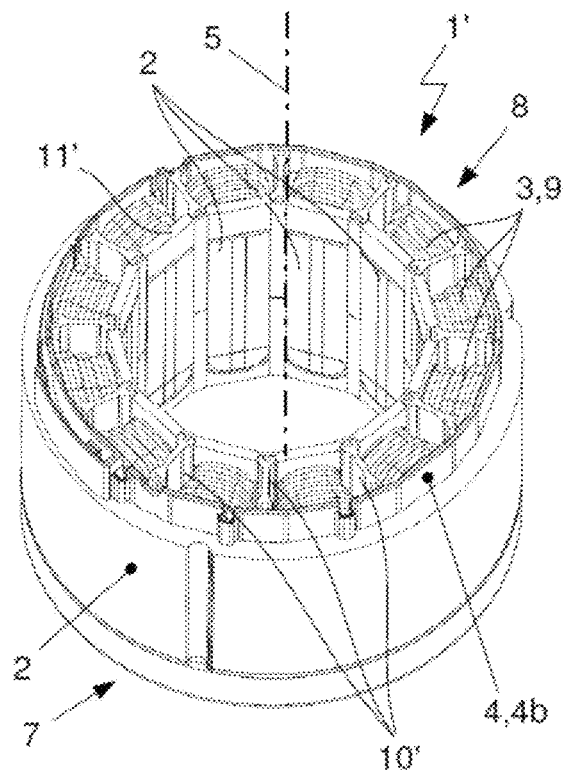
Fig. 11A  Fig. 11B
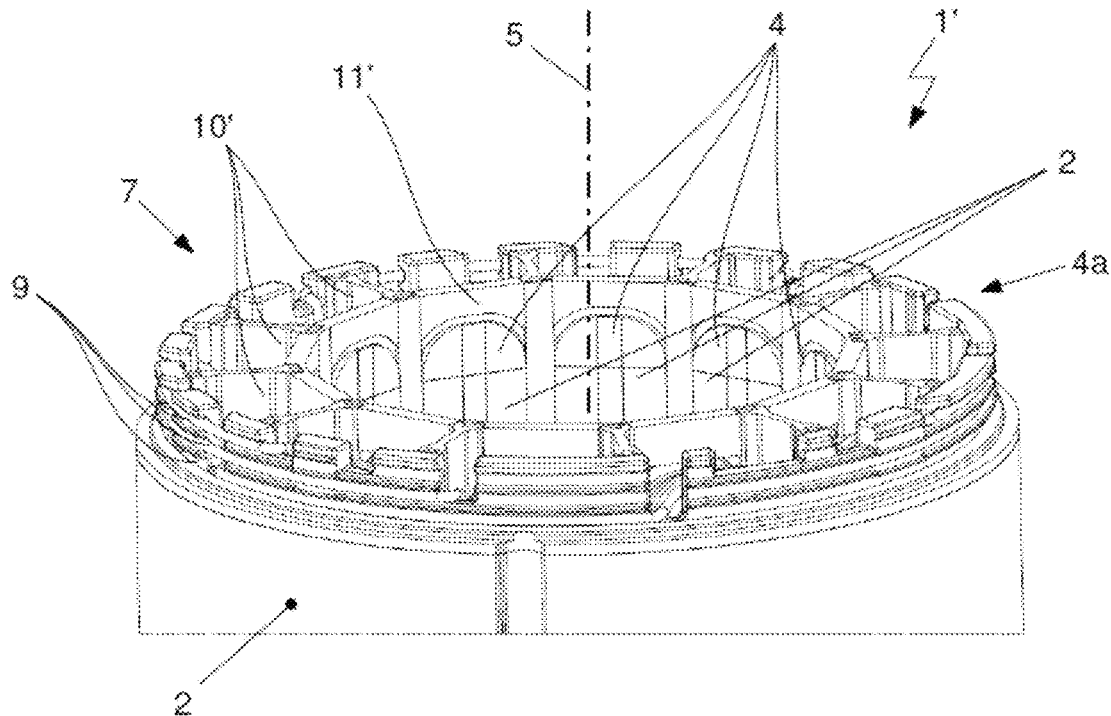
Fig. 12

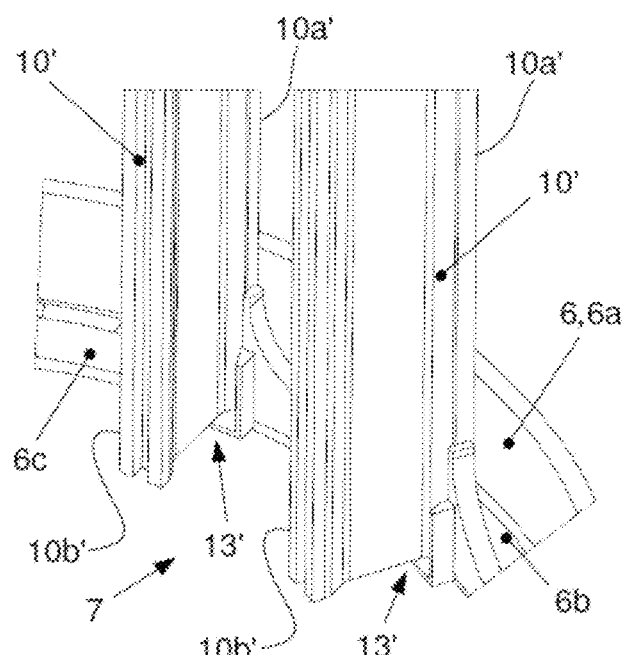
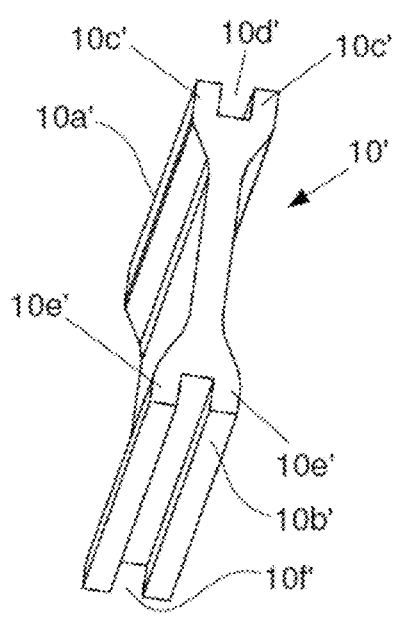
Fig. 15
Fig. 16
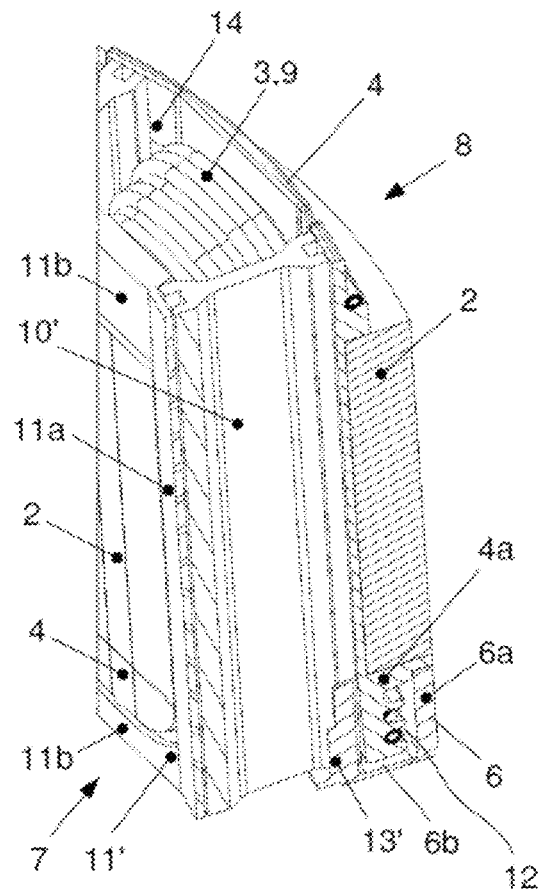
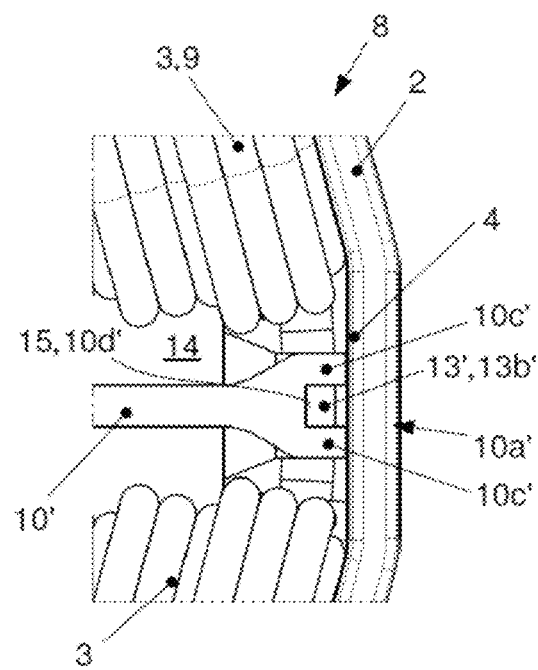
Fig. 17A
Fig. 17B

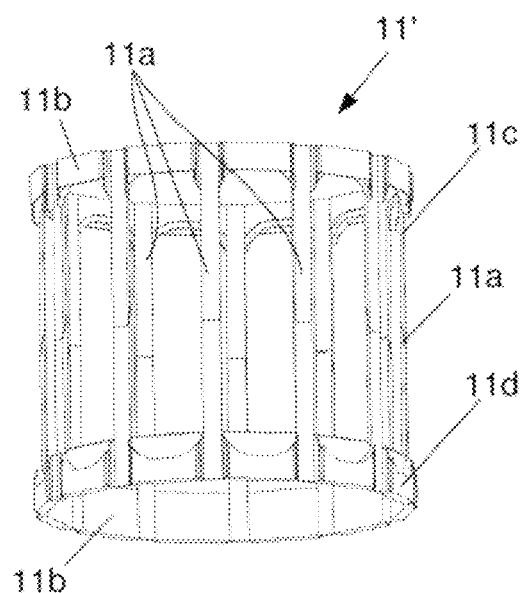
Fig. 19A
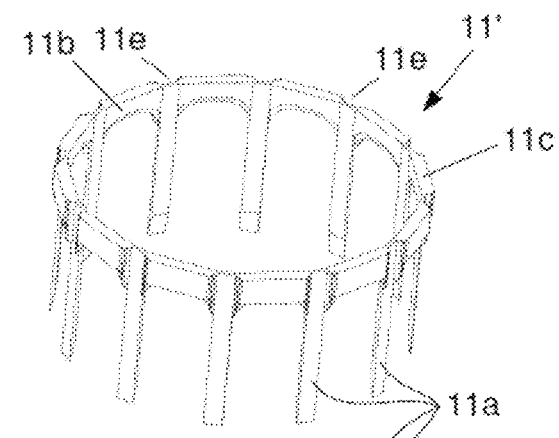
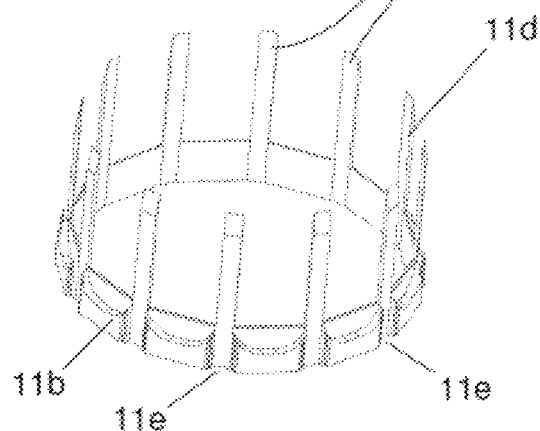
Fig. 19B
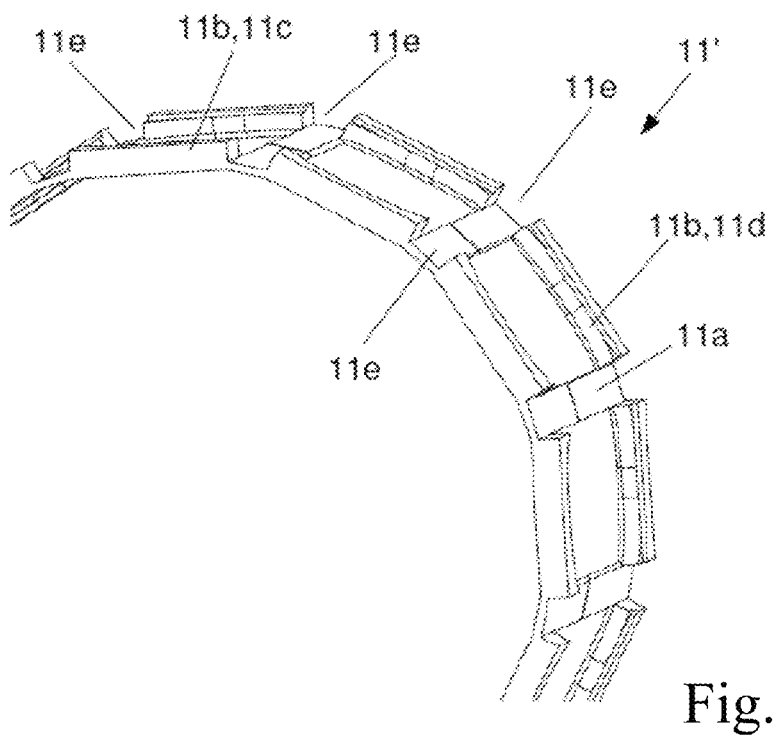
Fig. 19C

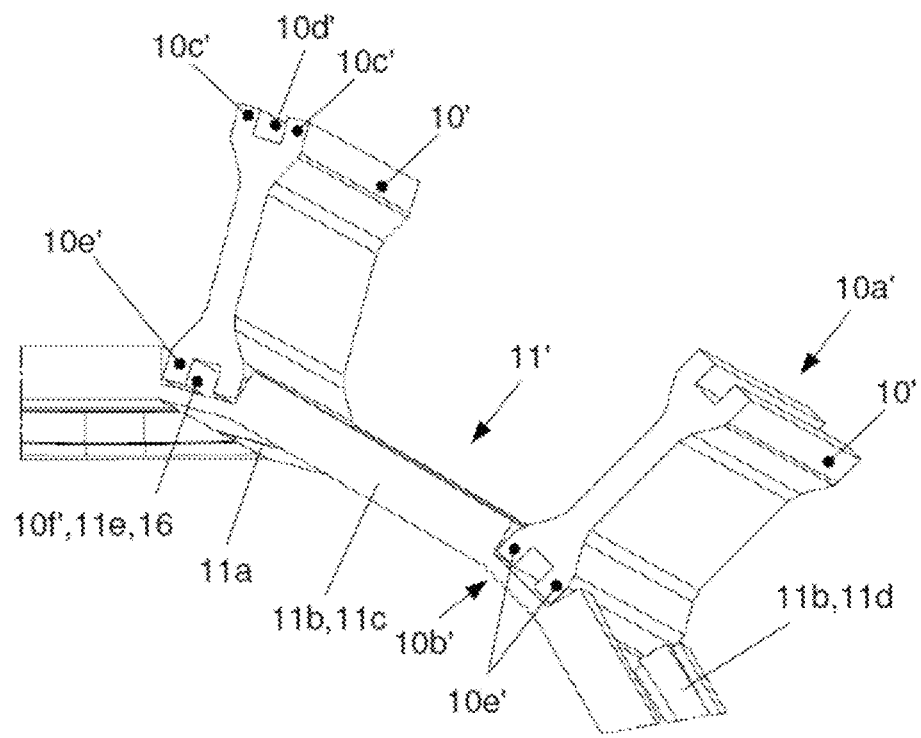
Fig. 20A
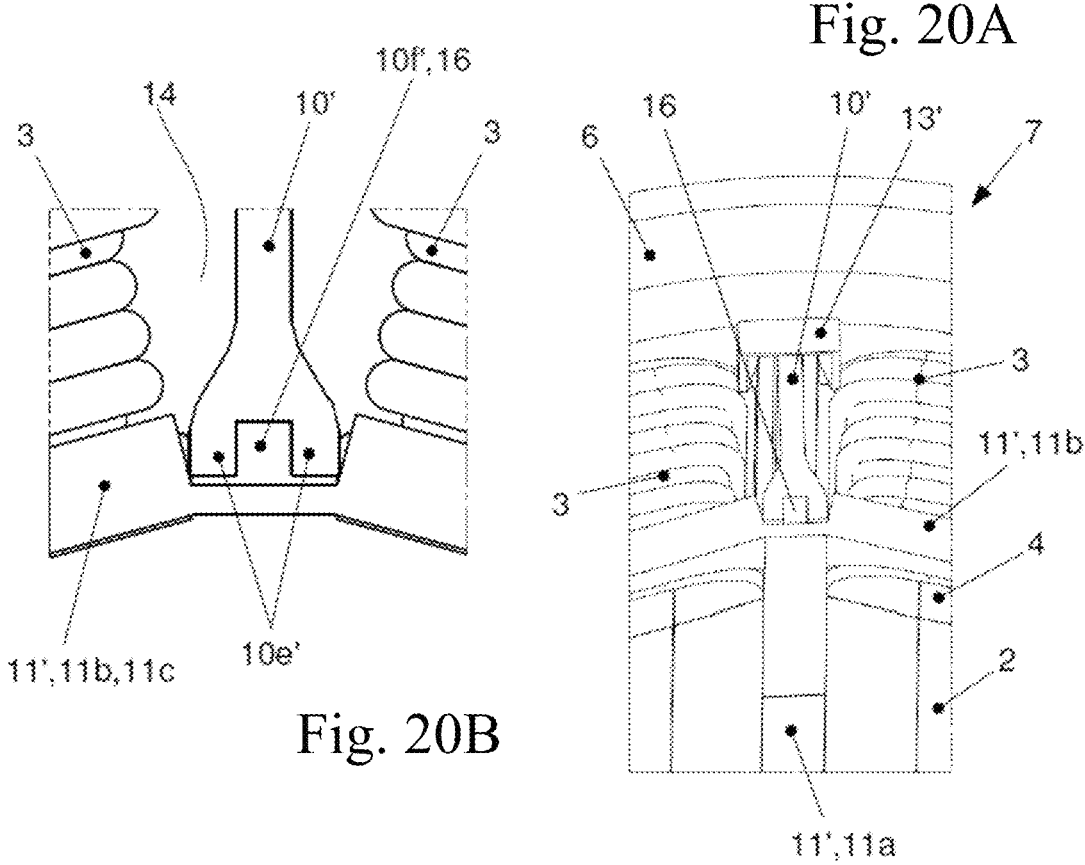
Fig. 20B
Fig. 20C

DEVICE FOR DRIVING A COMPRESSOR WITH AN INSULATION ARRANGEMENT

CROSS-REFERENCE TO RELATED PATENT APPLICATIONS

The present disclosure claims the benefit of German Patent Application No. DE 102019112541.3 filed May 14, 2019 and German Patent Application No. DE 102019112534.0 filed May 14, 2019, the entire contents of which are hereby incorporated herein by reference.

FIELD

The invention relates to a device for driving a compressor, particularly an electric motor, for compressing a vaporous fluid, especially a coolant. The compressor can be used in the coolant circuit of a climate-control system of a motor vehicle. The device has a rotor and a stator with an insulation assembly, which extend along a common longitudinal axis. The insulation assembly is formed with at least one first insulation element, one second insulation element, as well as at least one third insulation element.

BACKGROUND

Compressors known from the prior art for mobile applications, particularly for climate-control systems of motor vehicles, to convey coolant through a coolant circuit, also characterized as coolant compressors, are often formed as a piston compressor with a variable piston displacement or as a scroll compressor, independently of the coolant. The compressors in this case are either driven by means of a belt pulley or electrically.

An electrically driven compressor has an inverter for driving the electric motor in addition to the electric motor for driving the respective compression mechanism. The inverter is used to convert direct current of a vehicle battery into alternating current, which is supplied to the electric motor by means of electrical connections.

Conventional electric motors of the electrically driven compressor are formed with an annular stator core with coils arranged thereon and a rotor, wherein the rotor is arranged within the stator core. The rotor and stator are aligned on a common axis of symmetry or the axis of rotation of the rotor, arranged enclosed by a housing with additional elements. In order to reduce the installation space within the motor vehicle, on the one hand, and to affix the stator within the housing, on the other hand, the distances between components of the electric motor are very small, particularly distances between the stator and housing.

The inverter has plug connections for connectors formed as separate components and pins for electrically connecting with connections of the electric motor, which, in turn, are electrically connected to connection lines of the conducting wires of the coils of the stator. The connection lines are routed on end faces of the stator core and, in doing so, are usually not covered by stator insulation, which at least partially encloses the stator core, for housing of the motor.

In order to simultaneously ensure an electrical connection and high insulation resistance, for example between the connection lines of the conducting wires, the connection lines and/or the conducting wires, also characterized as phase conductors, must be electrically insulated from one another and from other electrically conducting components of the stator as well as of the motor housing.

In addition, sufficient insulation distances required as a function of the voltage level must be ensured between electrically conductive components, for example to prevent short-circuits caused by insufficient creepage paths and air gaps. The insulation may also have defects and/or porosities, particularly so-called pinhole porosities, or pinholes, based on the production process and which significantly reduce insulation resistance, to the extent that the risk of a flashover increases, particularly to housing components. Depending on the quality of the coated copper wire, a certain maximum number of flaws is permitted per unit of length. If two of the copper wires, each having a flaw, are arranged next to each other and the flaws are positioned directly opposite or at least close to each other, the risk of an electric flashover between the copper wires is very great.

Thus, the requirements in an electrically driven compressor are extremely high, particularly due to operation in a high-voltage range, for example of up to 1000 V. International standards require, for example, that the creepage paths and air gaps between two conducting wires or electrically conductive components to be enclosed be at least 10 mm to 14 mm in the indicated voltage range. Within a cutting-edge electric motor for extra-high voltages (EHV) of about 400 V, in which the shortest air gap between two coils is typically about 4 mm and the shortest creepage path is typically about 5 mm, the insulation system for use with ultra-high voltages (UHV) of up to 1,000 V for hermetically sealed electric motors for climate-control applications represents the biggest challenge for the automotive industry. In this case, a simple pressing of two components against each other does not lead to elimination of a potential flow path for the leakage current flow. There is always a gap for the current flow between the aligned and adjacent components.

It is known from the prior art to provide insulation between the conducting wires wound into coils, the connection lines of the conducting wires, and the electrically conductive stator core. In addition, the wound conducting wires are to be routed, depending on the winding diagram, as connecting lines between the coils of a phase and the ends of the conducting wires in a predefined manner.

WO 2015 146677 A1 discloses an electrically driven compressor with a compression assembly, an electric motor for driving the compression assembly, and an inverter for supplying the electric motor with voltage. The electric motor has a rotor and a stator with electrically insulating bobbins arranged on the ends of a stator core formed in the axial direction, electrically insulating bobbins, as well as on coils arranged on the bobbins. The coils are formed from conducting wires wound about an area of the stator core extending inward in the radial direction as well as the bobbins arranged at the ends of the stator core.

In doing so, the most varied of components are used for the stator insulation. Individual insulators are provided between the areas of the stator core formed as bars and extending inward uniformly over the circumference of an outer wall in the radial direction and the coils. An insulator, which is formed as insulating paper or foil, is also arranged between all adjacently arranged coils or conducting wires wound into coils.

In addition, the electrically driven compressor for electric motors, which are part of the prior art, for achieving the necessary insulation distances provide for sufficiently large spacing between the connection lines of the conducting wires and other electrically conductive components of the compressor. In this case, a large installation space is needed for the motor and consequently also for the electrically driven compressor.

SUMMARY

The object of the invention is the provision and improvement of an insulation assembly of a device for driving an electrically driven compressor of a vaporous fluid, particularly of an electric motor. The device should also ensure the applicable requirements for insulation coordination are met at voltage levels of up to at least 1,000 V. In this case, particularly the conducting wires of the coils should be electrically insulated with respect to each other or the connection lines of the conducting wires with respect to each other and with respect to electrically conductive components arranged for enclosure. It should be possible to mount the insulation assembly and thus the device in a simple manner and thus time-saving manner, and the insulation assembly and device should have the least possible number of individual components and be easy to implement from a design perspective in order to minimize, for example, the weight and the space requirements as well as costs during production.

The object is achieved by the subject matter having the features described herein.

The object is achieved by means of a device according to the invention for driving a compressor of a vaporous fluid, particularly an electric motor. The device has a rotor and a stator with a stator core as well as an insulation assembly, which extend, along a common longitudinal axis, from a first end face to a second end face of the stator. The stator core is formed with bars uniformly distributed on the circumference for accommodating conducting wires wound into coils, which are arranged distributed particularly on an inner side of an outer wall of the stator core. The insulation assembly has at least one first insulation element, second insulation elements, as well as at least one third insulation element.

The conducting wires are preferably formed from coated and wound copper wire in the area of the coils, wherein non-wound ends of the conducting wires are routed from the respective winding as connection lines and magnetically inactive sections of the conducting wires from the respective winding. A first part of the connection lines, which are used, for example, as connecting lines to connect and join together coils of the same phase, are only coated, similar to the conducting wires, in the area of the coils, while a second part of the connection lines, which are configured, for example, to connect to connections of the electric motor, are preferably sheathed with a plastic as insulation.

According to the concept of the invention, the at least one first insulation element is arranged between conducting wires, which are particularly wound into coils, and the stator core; a respective second insulation element is arranged in an intermediate space formed between coils arranged adjacent one another; and the at least one third insulation element is arranged on an inner side of the stator, said inner side pointing inward in the radial direction, in a manner so as to seal the inner side.

According to one refinement of the invention, the intermediate space respectively formed between two bars arranged adjacent to one another, with the first insulation element shaped about the bars, is open inward in the radial direction, i.e. on the inner side of the stator. In doing so, each intermediate space in the area between the end faces of the bars is formed with a minimal expansion.

According to an advantageous design of the invention, every second insulation element, which extends continuously in the axial direction between the end faces of the stator, has a first longitudinal side and second longitudinal side extending in the axial direction and aligned in the radial direction.

The axial direction in this case is understood to be the direction of the longitudinal axis of the stator, which also corresponds to the longitudinal axis and the axis of rotation of the rotor. An end face aligned in the axial direction is arranged in a plane aligned perpendicular to the longitudinal axis.

Consequently, a longitudinal side proceeding in the axial direction extends between the end faces of the stator parallel to the longitudinal axis, while the radial alignment is understood to be perpendicular as relates to the longitudinal axis.

Every second insulation element is preferably aligned with the first longitudinal side radially outward and preferably fits closely together continuously with a base area of the intermediate space on the first insulation element. The second insulation elements are advantageously arranged fitting closely with the first insulation element with the respective second longitudinal side aligned radially inward in the area of the end faces of the bars of the stator core, which seal off the intermediate spaces in the axial direction.

A further advantage of the invention is that the cross-section of every second insulation element has a U-shape with two first bars, particularly with a constant width, which delimit a first recess on both sides, perpendicular to the longitudinal direction in the area of the first longitudinal side. In this case, a closed side of the U-shape is aligned in the direction of the second longitudinal side.

The end faces of the first bars may fit closely with the first insulation element over the entire first longitudinal side. In this case, the second insulation elements with the two first bars fit closely with the first insulation element in the axial direction, forming a first cavity. The first cavity is preferably completely closed and can be potted with a potting material.

The cross-section of the second insulation elements preferably have a Y-shape or a U-shape, each with two second bars, particularly of constant width, said bars limiting a second recess, perpendicular to the longitudinal direction in the area of the second longitudinal side. In this case, a respective closed side of the Y-shape or the U-shape is aligned in the direction of the first longitudinal side.

The first longitudinal side and the second longitudinal side of a second insulation element are each connected to one another via a connecting bar.

According to a preferred embodiment of the invention, grooves, which are aligned in the longitudinal direction, each preferably extending over the entire length of the second insulation element, are provided at free end faces, arranged aligned with respect to the second longitudinal side of the second insulation element, of the second bars, which are arranged in a Y-shape.

According to one refinement of the invention, the at least one third insulation element has the shape of a cylindrical cage with braces extending in the axial direction. In this case, the braces are connected to one another at the first and second ends, respectively, via an entirely closed ring. The ring preferably has a wall formed in the axial direction. The braces are preferably arranged distributed uniformly, equidistant to one another, on the circumference.

According to a further advantageous embodiment of the invention, the third insulation element is formed in two pieces with a first sub-element and a second sub-element. In this case, the sub-elements each have an even ring and braces arranged protruding from the ring perpendicularly.

The braces of the first sub-element and the braces of the second sub-element are preferably each formed on free ends arranged aligned with one another with latching devices corresponding to one another, which can be connected to one another in an interlocking manner such that these sub-elements can be joined together at the free ends of the braces.

The third insulation element preferably has recesses arranged uniformly distributed on the circumference in the area of the rings, said recesses being provided on an outer side of the rings and advantageously in an extension of a brace arranged in the axial direction.

The recesses preferably each taper toward the inner side of the ring in the radial direction. In doing so, an indent can be provided in the area of a transition from a reduced to a maximum wall thickness of the ring.

A particular advantage of the invention is that the second insulation elements fit closely with the third insulation element in the area of a recess as well as of a brace of the third insulation element.

According to a first alternative embodiment of the invention, the second insulation elements each fit closely with a brace of the third insulation element, with the second longitudinal side in the axial direction, and fit closely with an indent of a recess of a ring of the third insulation element with a groove of a second bar, forming a second cavity on the third insulation element. The grooves of the second bars of the second insulation element and the indents of the recess of the ring of the third insulation element in this case have shapes corresponding to one another.

According to a second alternative embodiment of the invention, the second insulation elements each fit closely with a brace of the third insulation element, with the second longitudinal side in the axial direction, and fit closely with a base area of a recess of a ring of the third insulation element with an end face of a second bar, forming a second cavity on the third insulation element.

The second cavity, which is formed on a recess between the second insulation element and the third insulation element by means of second bars of the second insulation element and by means of a brace of the third insulation element as well as formed in the area of the rings of the third insulation element by means of the wall of the ring, said cavity consequently resulting from the second recess of the second insulation element and the corresponding recess of the third insulation element, is preferably completely closed.

The second cavity can be potted with a potting material, i.e. filled with the potting material.

According to one refinement of the invention, the first insulation element is designed as a single part and connected to the stator core of the stator in a form-fitting manner such that the stator core and the first insulation element form an integral and single-part component of the stator. The first insulation element, in this case, can be formed as a mold of the stator core fitting closely with an inner surface of an outer wall of the stator core.

According to a further preferred embodiment of the invention, the first insulation element protrudes over the stator core, at least on one end face of the stator. An area of the insulation element protruding from the stator core on the end face of the stator in the axial direction is preferably formed as a substantially cylindrical wall, particularly with moldings, for connecting to a cover element.

In this case, the outer side of the wall of the insulation element advantageously has at least one molding, which is formed circumferentially in the circumferential direction and as a depression, particularly as a groove. The at least one molding within the wall of the insulation element is preferably arranged in a plane aligned perpendicular to the longitudinal axis of the stator. Sections of the connection lines of the conducting wires are preferably aligned to fit closely with the outer side of the wall of the insulation element and to extend in the circumferential direction of the wall.

In this case, a section of a connection line of a conducting wire is advantageously arranged completely integrated within a molding formed in the wall of the insulation element. The complete integration is understood to be the arrangement of the connection line of the conducting wire in the molding, in which the conducting wire has its complete diameter embedded within the molding. The conducting wire does not protrude from the molding at any point. The maximum diameter of the conducting wire is less than the depth of the molding or corresponds to the depth of the molding.

The cover element is preferably arranged with the inner surface so as to cover each molding formed in the wall of the insulation element.

The cover element is advantageously formed as a completely closed ring with a first axially aligned ring surface, a radially aligned ring surface, as well as a second axially aligned ring surface. Just as the insulation elements of the insulation assembly, the cover element in this case is preferably formed from an electrically insulating material. Thus, the cover element arranged on the first insulation element of the stator is also provided particularly to ensure the necessary insulation distances.

The first axial ring surface formed on an outer radius of the cover element and a second axial ring surface formed on the inner radius of the cover element are preferably aligned parallel to one another and connected to one another via the radial ring surface.

According to one refinement of the invention, the second axially aligned ring surface of the cover element is provided as an inner wall with mounting elements arranged distributed uniformly about the circumference for holding a respective second insulation element. In doing so, the second insulation elements aligned in the axial direction can be connected to the cover element in the area of the mounting elements.

The mounting elements are preferably formed as openings within the second axially aligned ring surface. The mounting elements may have first walls and one second wall protruding from the second axially aligned ring surface inward in the radial direction.

Alternatively, the openings of the mounting elements may be formed with first walls and one second wall protruding from the second axially aligned ring surface inward in the radial direction.

According to one advantageous embodiment of the invention, the walls of the mounting elements have a U-shaped cross-section. In this case, the first walls are arranged as a leg of the U-shape, aligned in the axial direction, and the second wall is arranged in a manner so as to connect the first walls, aligned in the circumferential direction of the cover element.

According to a first alternative embodiment of the invention, the first walls of the mounting element are formed in the area of a side of the U-shape open in the axial direction, said U-shape having indents aligned conically to one another, which expand the clear cross-section of the mounting element toward the open side of the U-shape.

According to a second alternative embodiment of the invention, the first walls and the second wall of the mounting element are formed in the area of a side of the cross-section of the U-shape, said side being aligned open inward in the radial direction, said U-shape having indents aligned conically to one another, which expand the clear cross-section of the mounting element toward the open side of the cross-section of the U-shape.

The second insulation elements are preferably arranged in an area pointing toward the first end face of the stator as well as forming the first longitudinal side, which is aligned in the axial direction, said elements protruding into the U-shape marked by the walls of the mounting element and/or protruding into the opening formed in the inner wall of the cover element.

In this case, the second insulation elements within the mounting elements fit flush with the inner surfaces of the first walls of the mounting element, advantageously with outer surfaces of first bars. The second insulation element is incorporated within the mounting element, particularly pressed in an elastically deforming manner.

According to one refinement of the invention, the second insulation element is connected to the first insulation element in the area of minimal expansion of the intermediate space formed between coils arranged adjacent to one another, at end faces of the bars of the stator core, at a second bar respectively.

According to a first alternative embodiment of the invention, the second insulation element is arranged with grooves, which are formed on the end faces of the second bars, encompassing an edge of the bar of the stator core, said edge being aligned in the longitudinal direction.

According to a second alternative embodiment of the invention, the second insulation element fits closely with the inner surfaces of the bars of the stator core, with outer surfaces of second bars respectively. In this case, the second insulation element is incorporated between the bars of the stator core, particularly pressed in an elastically deforming manner.

With a method for mounting an insulation assembly of an aforementioned device for driving a compressor of a vaporous fluid, particularly of an electric motor, a second insulation element is arranged respectively in an intermediate space formed between two adjacently arranged bars of a stator core, with a first insulation element shaped around the bars. In this case, the second insulation element is arranged on the first insulation element, with a first longitudinal side aligned radially outward in the axial direction aligned on a base area of the intermediate space and with a second longitudinal side aligned radially inward in the area of end faces of the bars of the stator core, to seal off the intermediate space in the axial direction, on the first insulation element.

A cover element is advantageously fixed in position in an area of the first insulation element, said area protruding from the stator core on an end face of the stator, and every second insulation element is incorporated, particularly pressed, on the first longitudinal side within a mounting element of the cover element. The second insulation elements can additionally be affixed on the first insulation element, for example latched to the first insulation element on the second longitudinal side with two tongue-and-groove-type connections.

A further advantage is that the second insulation elements can be inserted into the mounting element of the cover element in the axial direction or in the radial direction.

In addition, a sub-element of a third insulation element, which is formed in two parts with braces, can preferably be inserted into the stator in the axial direction via an end face of the stator. In this case, the sub-elements are aligned with one another on free ends of the braces arranged aligned with one another. The sub-elements may be connected to one another at the ends of the braces arranged aligned with one another, for example braces formed with latch devices corresponding to one another. In this case, the second insulation elements and the third insulation element respectively delimit a cavity.

Furthermore, a volume enclosed by the first insulation element and the cover element and/or a first cavity formed between every second insulation element and the first insulation element and/or a second cavity formed between every second insulation element and the third insulation element can preferably be filled and/or potted with a potting material.

With the casting of the volume and/or cavities by means of the potting material as an additional adhesive, so-called cemented compounds are produced to close off any potential gaps for current flow and thus potential flow paths for leakage current. In this case, the respective insulation elements are connected, particularly bonded, to one another to prevent creepage paths. A cemented compound is consequently understood to be the connecting of two materials using a suitable adhesion means, such as an adhesive, resin, epoxy, or other potting material which prevents a flow of current between two electrically conductive components.

The advantageous embodiment of the invention enables the use of the device for driving a compressor, especially an electric motor, for compressing a vaporous fluid for a compressor of a coolant in a coolant circuit of a climate-control system of a motor vehicle.

The device according to the invention for driving a compressor of a vaporous fluid with a minimum number of necessary components, which are designed according to known standards such as the EIC/UL and DIN, and the method for mounting an insulation assembly of the device collectively have further various advantages:

easy assembly with the best-possible electrical insulation of the conducting wires, particularly fulfillment of existing specifications and general requirements for electric motors, especially in electrically driven compressors of climate-control systems for motor vehicles with voltage levels of up to 1000 V;
  increase in the insulation resistance and decrease in the space requirements depending on the voltage level;
  prevention of the occurrence of short-circuit currents between the conducting wires as well as other electrically conductive, inactive components by ensuring the necessary insulation distances depending on the voltage level;
  reduction in scrap during production as a result of low insulation resistance and thus generation of minimal costs; as well as
  maximization of the service life of the compressor.

BRIEF DESCRIPTION OF THE DRAWINGS

Further details, features, and advantages of embodiments of the invention result from the following description of exemplary embodiments with reference to the corresponding figures.

In this case, a first exemplary embodiment of the invention is shown in FIGS. 1 to 10, while FIGS. 11 to 20 show a second exemplary embodiment of the invention. The following is shown:

FIGS. 1A and 1B and FIGS. 11A and 11B: each show a stator of an electric motor as a device for driving a compressor of a vaporous fluid having a stator core, coils, a first insulation element and second insulation elements, as well as a third insulation element of an insulation assembly in the viewing direction of a first end face as well as in the viewing direction of a second end face, each in a perspective view;

FIG. 2 and FIG. 12: show the first end face of the stator from FIG. 1A and FIG. 11A, respectively, without the cover element, as a component of the insulation assembly, in a perspective detailed view;

FIG. 3 and FIG. 13: each show the stator without the second and third insulation elements of the insulation assembly, in a top view;

FIG. 5 and FIG. 15: each show the cover element with second insulation elements, arranged in mounting elements, of the insulation assembly, in a perspective detailed view;

FIG. 6 and FIG. 16: each show a second insulation element as an individual element, in a perspective view;

FIG. 7A and FIG. 17A: each show the stator with the stator core, coils, the cover element, and insulation elements of the insulation assembly, in a perspective sectional view;

FIG. 7B and FIG. 17B: each show an alignment of the first and second insulation element with respect to one another on an outer radius of the insulation assembly, in a detailed top view;

FIGS. 9A to 9C and FIGS. 19A to 19C: each show a third insulation element with a first and a second sub-element as assembled and in an exploded view, each in a perspective view;

FIG. 10A and FIG. 20A: each show an assembly of second insulation elements on the third insulation element as a detailed view of an end face of the third insulation element, in a perspective view;

FIG. 10B and FIG. 20B: each show a connection between the second and third insulation element on an inner radius of the insulation assembly, in a detailed top view;

FIG. 10C and FIG. 20C: each show an alignment of the cover element as well as the first, second, and third insulation element of the insulation assembly as relates to the coils, in a perspective detailed view;

DETAILED DESCRIPTION OF THE EMBODIMENTS

Figure 3:
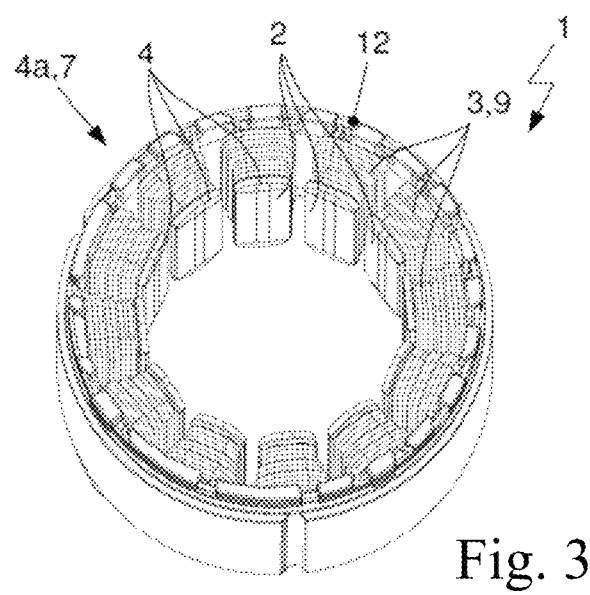

FIGS. 1A and 1B as well as FIGS. 11A and 11B each show a stator 1, 1' of an electric motor as a device for driving a compressor of a vaporous fluid, especially for a climate-control system of a motor vehicle, for conveying coolant through a coolant circuit, in the viewing direction of a first end face 7, according to FIG. 1A or FIG. 11A, respectively, as well as in the viewing direction of a second end face 8, according to FIG. 1B or FIG. 11B, respectively, each in a perspective view. The stator 1, 1' is formed with a stator core 2, coils 3, a first insulation element 4, and second insulation element 10, 10', as well as a third insulation element 11, 11' of an insulation assembly.

The electric motor, for example an alternating current motor with three phases, has a rotor, not shown, and a stator core 2 arranged in the radial direction on an outer side of the rotor and thus about the rotor. The stator core 2, which is preferably formed as a laminated core, and the insulation elements 4, 10, 10', 11, 11', each of which is formed from an electrically insulating material, extend along a longitudinal axis 5, which also corresponds to the longitudinal axis of the stator 1, 1' and the axis of rotation of the rotor, from the first end face 7 to the second end face 8 of the stator 1, 1'. The first insulation element 4 is advantageously formed as a mold of the stator core 2 and thus as a single-piece component.

The coils 3 are each formed from a wire, particularly a coated copper wire wound about an area of the stator core 2 extending inward in the radial direction, as an electric conductor, also characterized as a conducting wire 9. The non-wound ends of the conducting wires 9 are routed out of the respective winding as connection lines or magnetically inactive sections. Connection lines serving as the connecting lines for connecting and joining coils 3 of the same phase are formed exclusively insulated with coating as a first part of the connection lines, similar to the conducting wires 9, in the area of the coils 3, while a second part of the connection lines, which are configured for electrically connecting to connections of the electric motor, may additionally preferably be sheathed with a plastic as insulation.

The areas of the stator core 2 which extend inward in the radial direction have the shape of a bar and are positioned uniformly distributed about the circumference of an outer wall of the stator core 2. The first insulation element 4, which electrically insulates the stator core 2 and the conducting wires 9 of the coils 3 with respect to one another, is arranged between the conducting wires 9 of the coils 3 and the respective areas of the stator core 2. The first insulation element 4 is extended in the axial direction at the ends of the bars aligned inward and in the radial direction. The end sections, which protrude thusly, of the first insulation element 4 are used, inter alia, to affix the conducting wires 9 of the coils 3, said conducting wires being wound about the bars of the stator core 2.

An intermediate space, in the form of a groove or gap or a slot, which is open inward on the end faces 7, 8 of the stator 1, 1' as well as in the radial direction, is situated between two bars which are arranged adjacent to one another distributed on the circumference of the outer wall of the stator core 2, with the first insulation element 4 shaped about the bars as well as the conducting wires 9 wound into coils 3 around the first insulation element 4.

The bars are formed with the first insulation element 4 extensively arranged around the bars with substantially constant cross-sectional surfaces in the radial direction, except for the area of the end faces of the bars, such that the intermediate spaces taper inward in the radial direction. In the area of the end faces, the bars additionally have a larger cross-sectional surface than, for example, in the area of the outer wall of the stator core 2. Thus, the intermediate spaces are formed with a minimal expansion in the area between the end faces of the bars. In the axial direction, the cross-sectional surfaces of the intermediate spaces are constant.

The first insulation element 4 is formed between the coils 3 and the stator core 2 as well as particularly about the entire inner shape of the stator core 2, with the exception of the end faces of the bars. Consequently, the end faces, which are aligned inward in the radial direction and not covered by the insulation element 4, of the bars of the stator core 2 are not electrically connected to the conducting wires 9 of the coils 3.

A second insulation element 10, 10' is provided within the intermediate spaces and thus between magnetically active sections of the conducting wires 9 wound into coils 3, said sections being arranged extensively adjacent on the stator core 2. The second insulation element 10, 10' in this case extends continuously in the axial direction between the end faces 7, 8 of the stator 1, 1' and is used to insulate the coils 3 aligned next to each other on the circumference.

While the second insulation element 10, 10' fits closely on the first insulation element 4 with a first longitudinal side aligned in the axial direction, preferably continuously on a base area of the intermediate space, a second longitudinal side, aligned parallel to the first longitudinal side, of the second insulation element 10, 10' points radially inward and fits closely with the first insulation element 4 in the area of the end faces of the bars of the stator core 2, which seal off the intermediate spaces formed between the bars and/or coils 3 in the axial direction. In the areas protruding in the axial direction over the bars with the coils 3, the second insulation elements 10, 10' fit closely with the third insulation element 11, 11'.

The third insulation element 11, 11' has the shape of a round cage with braces extending in the axial direction, which are connected to one another at the first and second ends via a closed ring. The axially aligned braces, together with the second insulation elements 10, 10', are used, on the one hand, to seal off the intermediate spaces of the first insulation element 4, which are formed between the bars and/or coils 3, in the area of the end faces of the bars, said end faces pointing inward in the radial direction. On the other hand, an extensively closed gap and/or cavity is formed between every second insulation element 10, 10' and the third insulation element 11, 11'. The rings arranged at the end faces of the third insulation element 11, 11' are provided for forming a closed inner surface of the stator 1, 1' as well in the areas protruding over the bars with the coils 3 in the axial direction.

The first insulation element 4, which is preferably formed as an electrically insulating mold of the stator core 2 and which fits closely with an inner side of an outer wall of the stator core 2 in the radial direction, with an external shell surface, covers the entire surface of the stator core 2 to be insulated. In addition, the wall of the first insulation element 4 protrudes over the stator core 2 in the axial direction, at the end faces 7, 8 of the stator 1, 1'. The areas 4b of the first insulation element 4, which protrude from the stator core 2, are formed as a substantially hollow-circular-cylinder-shaped wall with moldings, wherein the wall is arranged in the axial direction.

The annular cover element 6, which fits completely with the stator 1, 1', particularly with the first insulation element 4, in the axial direction when the stator 1, 1' is mounted, is arranged on the first end face 7 of the stator 1, 1' according to FIG. 1A or FIG. 11A, respectively. A first area of the first insulation element 4, which is not shown but protrudes over the stator core 2 on the first end face 7 is covered by the cover element 6 when assembled. The cover element 6 is formed as an axially aligned, extensively closed ring substantially in the shape of a cylinder, particularly in the shape of a hollow cylinder, especially in the shape of a hollow circular cylinder.

FIG. 2 and FIG. 12 respectively show the first end face 7 of the stator 1, 1' from FIG. 1A and/or FIG. 11A without the cover element 6 as a component of the insulation assembly, in a perspective detailed view.

The magnetically inactive and unwound sections of the conducting wires 9, said sections extending between the windings of the coils 3 as connecting lines, are integrated into indents, also characterized as mounting areas, which are formed on the first area 4a of the first insulation element 4 protruding over the stator core 2 extending in the circumferential direction and extending as grooves parallel to one another. In addition, the magnetically inactive sections of the conducting wires 9 may be arranged within such indents, as a connection to a connection of the electric motor, particularly to a connector housing and/or plug connectors as electrical connections to an inverter. Thus, the sections of the conducting wires 9 are routed and insulated with respect to one another to the sections wound into coils 3 and to the other electrically conductive components. The indents are each formed in a plane aligned perpendicular to the axial direction of the stator 1, 1'.

Depending on the voltage level of the electric motor, standardized corresponding distances, also characterized as insulation distances, must be maintained between the conducting wires 9 and other electrically conductive, metallic components of the electric motor, such as a housing, or components of the compressor, in order to prevent, for example, short-circuits or flashovers between the conducting wires 9 themselves and electrically conductive components arranged adjacent thereto. The insulation distances are significantly reduced and the risk for short-circuits or flashovers are reduced through the provision of the insulation assembly with the first insulation element 4, the second insulation elements 10, 10', as well as the third insulation element 11, 11', and the cover element 6.

Figure 13:
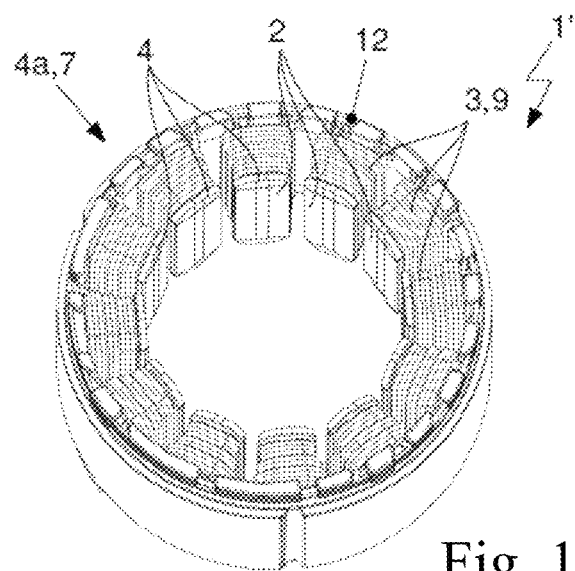

FIG. 3 and FIG. 13 each show the stator 1, 1' without second insulation elements 10, 10' and without the third insulation element 11, 11' as well as without the cover element 6 of the insulation assembly, in a top view of the first end face 7. The first area 4a of the first insulation element 4, said area protruding from the stator core 2 at the first end face 7 of the stator 1, 1', with the magnetically inactive sections of the conducting wires 9, is also characterized as a connection ring.

The air gap between two adjacent coils 3 is increased, for example to more than 10 mm, with the use of the second insulation elements 10, 10', which are not shown, and also designated as coil separators. In addition, so-called cemented or potted compounds are created with the use of potting material 12, such as epoxy resin or a suitable adhesive, in order to extend the creepage paths, for example to at least 14 mm, such that all requirements for insulation are met. The potting of entire critical areas is thus a further way of ensuring sufficient creepage paths.

In doing so, the cover element 6, which is not shown, is also used as a potting mold for the potting material 12, which separates the conducting wires 9 of different phases from one another, in addition to protecting the connection ring. Because the conducting wires 9 are arranged very close to one another, the necessary creepage paths and air gaps are ensured through the potting of all cavities formed between the wall, protruding from the stator core 2, of the first area 4a of the first insulation element 4 and an inner side of the cover element 6 with the potting material 12, with the conducting wires 9 embedded therein. The connection ring with the components routing the conducting wire is insulated either with the filling of the cavities formed between the wall, protruding from the stator core 2, of the first area 4a of the first insulation element 4 and the inner side of the cover element 6 or in advance with potting material 12. Thus, an insulating system is provided, for example, which fulfils the requirements for applications with ultra-high voltages of up to 1000 V.

Complete hermetic sealing of the conducting wires 9 arranged on the connection ring to coolant as fluid flowing within the housing of the electric motor and between the conducting wires 9 themselves is achieved with the covering of the first area 4a, protruding from the stator core 2 on the first end face 7 of the stator 1, 1', of the first insulation element 4 by means of the cover element 6 and by means of the potting material 12.

Figure 4A:
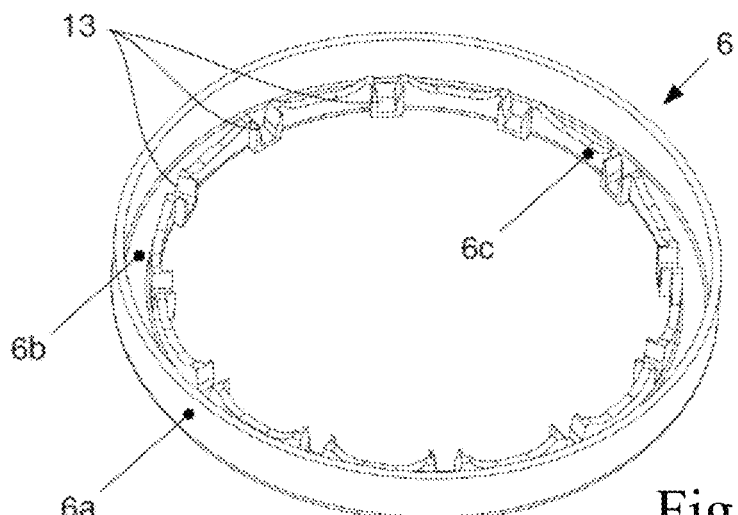
FIG. 4A and FIG. 14A: each show the cover element as a component of the insulation assembly, in a perspective detailed view.
Figure 4B:
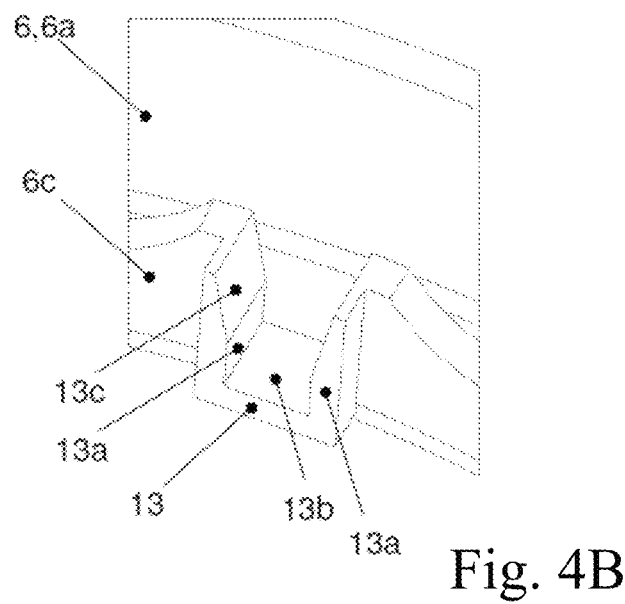
FIG. 4B and FIG. 14B: each show a mounting element of the cover element, in a detailed view.
Figure 14A:
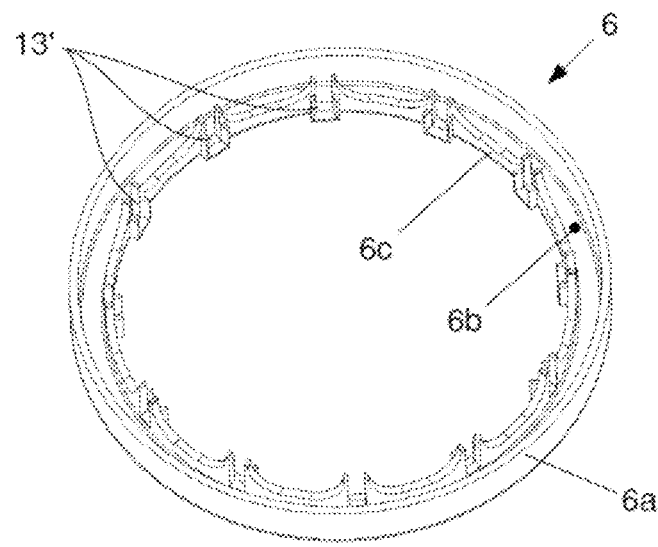
Figure 14B:
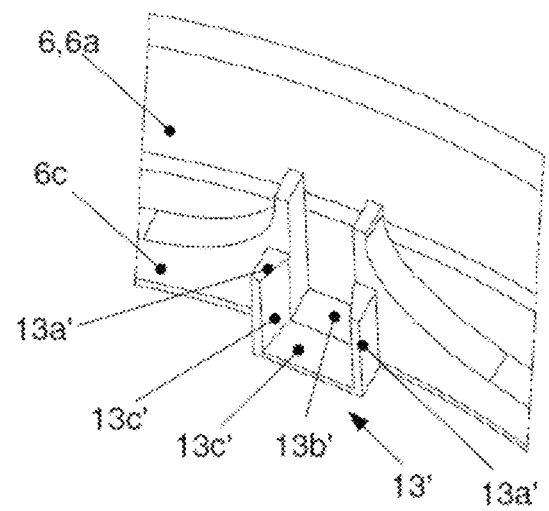

FIGS. 4A and 4B as well as FIGS. 14A and 14B each show the cover element 6 as a component of the insulation assembly, in a perspective detailed view. In this case, FIG. 4B and/or FIG. 14B particularly show a mounting element 13, 13' of the cover element 6 for a second insulation element 10, 10', in a detailed view.

The cover element 6 formed as a completely closed ring has a first axially aligned ring surface 6a, a radially aligned ring surface 6b, as well as a second axially aligned ring surface 6c. The first axial ring surface 6a formed on an outer radius of the cover element 6 and the second axial ring surface 6c formed on the inner radius of the cover element 6 are preferably aligned parallel to one another and connected to one another via the radial ring surface 6b. The radial ring surface 6b arranged perpendicular to the longitudinal axis 5 connects the axial ring surfaces 6a, 6c to one another such that the cover element 6 has a U-shaped, preferably with different leg lengths, in a cross-section through the ring contour. The first axial ring surface 6a is formed as an outer wall 6a with an expansion that is greater in the axial direction than the second axial ring surface 6c as an inner wall 6c. The radial ring surface 6b connects the axial ring surfaces 6a, 6c to one another at respective end faces.

The volume formed between the ring surfaces 6a, 6b, 6c is used to accommodate the first area 4a, protruding from the stator core 2, of the first insulation element 4, i.e. of the connection ring, with the conducting wires 9 arranged thereon as well as a potting mold for accommodating potting material 12.

In comparison with the completely closed outer wall 6a, the inner wall 6c has openings uniformly distributed on the circumference, particularly mounting elements 13, 13' for retaining the second insulation elements 10, 10'. In this case, each mounting element 13, 13' is used for mounting a second insulation element 10, 10' arranged in the intermediate spaces formed between the coils 3.

The openings formed within the inner wall 6c are reinforced with first walls 13a, 13a' and a second wall 13b, 13b' extending in the radial direction inward away from the inner wall 6c, said walls forming a U-shape in the cross-section. In this case, the two first walls 13a, 13a' are arranged as a leg of the U-shape, aligned in the axial direction, while the second wall 13b, 13b' is aligned in the circumferential direction of the cover element 6, arranged in a manner so as to connect the first walls 13a, 13a'.

The first walls 13a of the mounting element 13 of the first exemplary embodiment of the invention according to FIG. 4B have indents 13c extending conically to one another in the area of the open side of the U-shape, said indents being aligned such that the clear cross-section of the mounting element 13 expands toward the open side of the U-shape, particularly to facilitate the insertion of the second insulation elements 10 into the mounting elements 13 in the axial direction during assembly of the stator 1.

According to the second exemplary embodiment of the invention according to FIG. 14B, both the first walls 13a' and the second wall 13b' of the mounting element 13' have indents 13c' extending conically to one another in the area of the open side of the U-shape, aligned inward in the radial direction, which are aligned such that the clear cross-section of the mounting element 13' expands toward the open side of the cross-section of the U-shape, particularly to facilitate the insertion of the second insulation elements 10' into the mounting elements 13' in the axial direction during assembly of the stator 1'.

FIG. 5 and FIG. 15 each show the cover element 6 arranged on the first end face 7 of the stator 1, 1' with second insulation elements 10, 10', arranged in the mounting elements 13, 13', of the insulation assembly, in a perspective detailed view.

The second insulation elements 10, 10', which are aligned in the axial direction, are connected to the cover element 6 in the area of the mounting elements 13, 13'. In this case, the second insulation elements 10, 10' are preferably arranged in an area pointing toward the first end face 7 of the stator 1, 1' as well as forming the first longitudinal side 10a, 10a', which is aligned in the axial direction, said elements protruding into the U-shape marked by the walls 13a, 13a', 13b, 13b' and protruding into the opening formed in the inner wall 6c of the cover element 6.

The second insulation elements 10, 10' are inserted or pushed into the mounting elements 13, 13' of the cover element 6 in the axial direction during the assembly process.

While the first longitudinal side 10a, 10a' of the second insulation elements 10, 10' is arranged pointing outward in the radial direction, a second longitudinal side 10b, 10b', aligned in the axial direction, of the second insulation elements 10, 10' is arranged pointing inward in the radial direction.

FIG. 6 and FIG. 16 each show a second insulation element 10, 10' as a single element, in a perspective view. The second insulation element 10, 10' is delimited by the two parallel aligned longitudinal sides 10a, 10a', 10b, 10b' as well as likewise parallel aligned narrow sides, which connect the longitudinal sides 10a, 10a', 10b, 10b' to one another. The narrow sides are arranged at the end faces 7, 8 of the stator 1, 1' in the mounted state.

In the cross-section perpendicular to the longitudinal direction, the second insulation element 10 of the first exemplary embodiment of the invention according to FIG. 6 has a U-shape, particularly the shape of an open-end wrench or an adjustable wrench, in the area of the first longitudinal side 10a, with two first bars 10c of constant width, which delimit a first recess 10d on both sides. The first recess 10d, which is open in the direction of the first longitudinal side 10a, has a rectangular cross-section, particularly a square-shaped cross-section. The closed side of the U-shape is aligned in the direction of the second longitudinal side 10b. The first longitudinal side 10a and the second longitudinal side 10b of the second insulation element 10 are connected to one another via a connecting bar.

In the area of the second longitudinal side 10b, the cross-section of the second insulation element 10 is formed, perpendicular to the longitudinal direction, in a Y-shape with two bars 10e of constant width, which delimit a second recess 10f on both sides. The second recess 10f, which is open in the direction of the second longitudinal side 10b, has a triangular cross-section, particularly in the form of an isosceles triangle, especially an equilateral triangle. The closed side of the Y-shape is aligned in the direction of the first longitudinal side 10a. Grooves 10g, which are aligned in the longitudinal direction, are provided at the free end faces of the second bars 10e, said end faces arranged so as to point toward the second longitudinal side 10b.

In the cross-section perpendicular to the longitudinal direction, the second insulation element 10' of the second exemplary embodiment of the invention according to FIG. 16 has a U-shape, particularly the shape of an open-end wrench or an adjustable wrench, in the area of the longitudinal sides 10a', 10b', with two first bars 10c' of constant width and two second bars 10e' of constant width, which delimit a recess 10d', 10f' on both sides. The first recess 10d', which is open in the direction of the first longitudinal side 10a' and the second recess 10f', which is open in the direction of the second longitudinal side 10b', have a cross-section which is rectangular, particularly square-shaped. The closed side of the U-shape of the first longitudinal side 10a' is aligned in the direction of the second longitudinal side 10b', while the closed side of the U-shape of the second longitudinal side 10b' is aligned in the direction of the first longitudinal side 10a'. The first longitudinal side 10a' and the second longitudinal side 10b' of the second insulation element 10' are connected to one another via a connecting bar.

The cross-section of the second insulation element 10, 10' in the longitudinal direction is formed with a constant area.

FIG. 7A and FIG. 17A each show the stator 1, 1' with the stator core 2, at least one coil 3, the cover element 6, which is preferably formed as an injection-molded element from an insulating material, arranged on the first end face 7, and insulation elements 10, 10', 11, 11' of the insulation assembly, in a perspective sectional view. FIG. 7B and FIG. 17B each show an alignment of the first insulation element 4 and a second insulation element 10, 10' with respect to each other, on an outer radius of the insulation assembly in a detailed view of the second end face 8 of the stator 1, 1', in a top view.

As is particularly shown in FIG. 7A and FIG. 17A, the cover element 6 is arranged to enclose the first area 4a of the first insulation element 4, said first area protruding from the stator core 2. In this case, the cover element 6 is arranged with an inner surface of the outer wall 6a aligned in the direction of an outer shell surface of the wall of the first area 4a of the first insulation element 4, said first area protruding from the stator core 2. The outer diameter of the wall of the first insulation element 4 corresponds substantially to the diameter of the inner surface of the outer wall 6a of the cover element 6, plus a gap for mounting the cover element 6 on the first insulation element 4 as well as to accommodate potting material 12. An outer surface of the outer wall 6a of the cover element 6 is aligned in the direction of a housing, which is not shown.

The annular cover element 6 is arranged with the inner surface of the outer wall 6a so as to seal off or cover the mounting areas circumferentially in the circumferential direction on the wall of the first area 4a, protruding from the stator core 2, of the first insulation element 4, said mounting areas being formed as grooves, into which the conducting wires 9 are integrated. Because the cover element 6, just as the first insulation element 4, comprises electrically insulating components, the conducting wires 9, which are arranged in indents, which are formed in the insulation element 4 and covered by the cover element 6, are completely enclosed by electrical insulation. The volume, which is substantially enclosed by the outer wall 6a of the cover element 6 and the wall of the first area 4a, which protrudes from the stator core 2, of the first insulation element 4, with the conducting wires 9 arranged therein, is additionally potted with potting material 12 to the extent that the first insulation element 10, 10' and the cover element 6 are durably connected to one another in an undetachable manner.

The annual cover element 6 is arranged with the radial ring surface 6b aligned in the direction of a free end face of the first area 4a of the first insulation element 4, said first area protruding from the stator core 2, while the inner wall 6c of the cover element 6 has an outer surface which fits closely with an inner shell surface of the wall of the first area 4a, which protrudes from the stator core 2.

The second insulation elements 10, 10' are retained within the mounting areas 13, 13' formed on the inner wall 6c of the cover element 6, and also arranged between two adjacent coils 3, and extend in the longitudinal direction between the end faces 7, 8 of the stator 1, 1'. The coils 3 are each formed from sections of the conducting wires 9 wound around bars of the stator core 2, said bars being formed inward in the radial direction. The end faces of the bars of the stator core 2, said end faces being aligned inward in the radial direction, are uninsulated in a large section, particularly not covered by the first insulation element 4.

The intermediate spaces 14 remaining between the bars of the stator core 2 and thus also the coils 3 are sealed off in the area formed between the end faces of the bars with the minimal expansion by means of the second insulation elements 10, 10' and/or the third insulation element 11, 11'. The third insulation element 11, 11', which has the shape of a round cage with braces 11a extending in the axial direction, which are connected to one another at the first and second ends via a closed ring 11b, completely encloses the inner side of the stator 1, 1', said inner side pointing in the radial direction. In this case, the intermediate spaces 14 between the bars of the stator core 2 are sealed off by the braces 11a in the axial direction in the area of minimal expansion, at the end faces of the bars, while the rings 11b of the third insulation element 11, 11' seal off the intermediate spaces 14 in the circumferential direction in the area of the end faces 7, 8 of the stator 1, 1'.

As is particularly shown in FIG. 7B and FIG. 17B, the second insulation elements 10, 10', which are arranged between adjacent coils 3, within the mounting elements 13, 13' of the cover element 6, fit flush with the inner surfaces of the first walls 13a, 13a' of the mounting element 13, 13', with outer surfaces of the first bars 10c, 10c', while the end faces of the first bars 10c, 10c' fit closely with the first insulation element 4 over the entire first longitudinal side 10a, 10a', forming a first cavity 15. The first recess 10d, 10d', which is formed between the first bars 10c, 10c', enables the first bars 10c, 10c' to be pressed together in the circumferential direction of the stator 1, 1' to the extent that the second insulation element 10, 10' is incorporated and especially pressed in an elastically deforming manner within the mounting element 13, 13', particularly between the first walls 13a, 13a' of the mounting element 13, 13'.

The first cavity 15 between the first insulation element 4 and the second insulation element 10, 10' is delimited respectively by the first bars 10c, 10c' of the second insulation element 10, 10' and the first insulation element 4. Thus, the first cavity 15, which extends in the axial direction, and which results from the first recess 10d, 10d' of the second insulation element 10, 10', is completely closed and only open at the end aligned in the direction of the second end face 8 of the stator 1, 1'. On the end aligned in the direction of the first end face 7 of the stator 1, 1', the first cavity 15 is delimited by the cover element 6, particularly the second wall 13b, 13b' of the mounting element 13, 13'.

The first cavities 15 can be filled or potted with a suitable potting material 12.

Figure 8A:
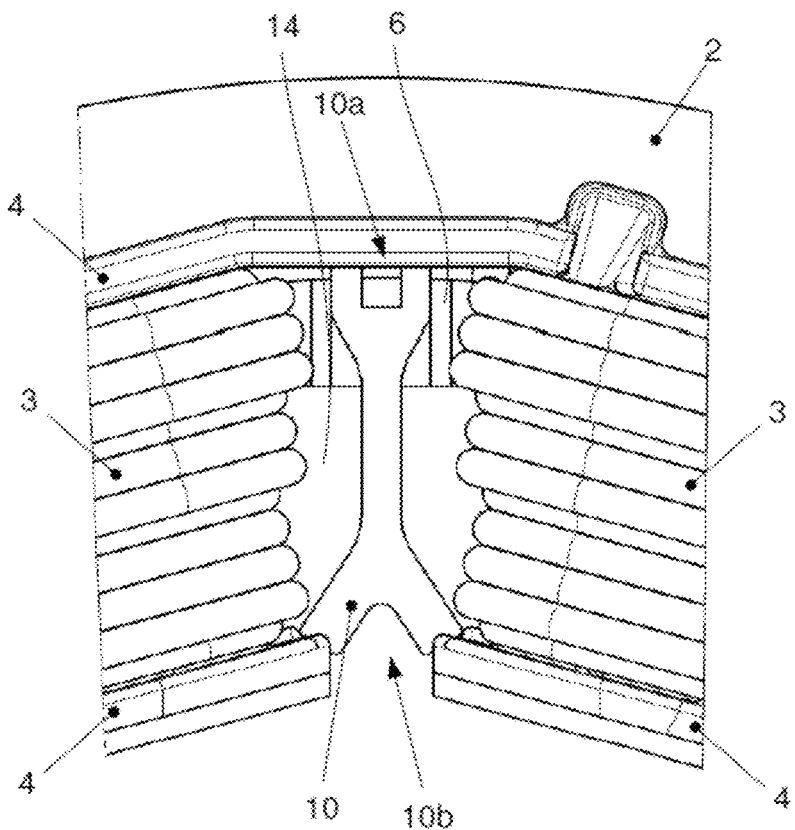
FIGS. 8A and 8B and FIGS. 18A and 18B: each show an alignment of the first and second insulation element of the insulation assembly as relates to the coils in a top view, with a detailed view of the connection between the first and second insulation element on an inner radius of the insulation assembly.
Figure 8B:
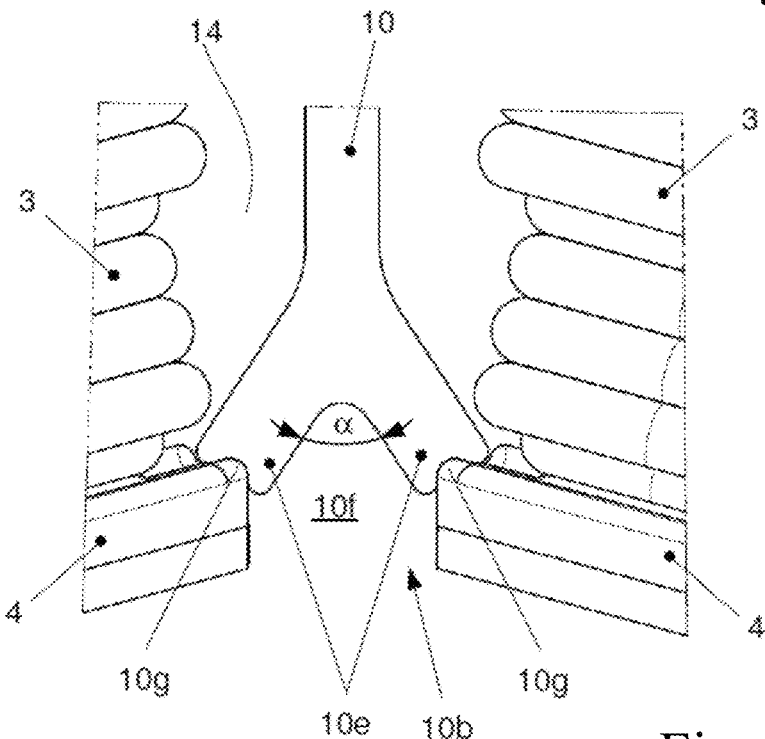
Figure 18A:
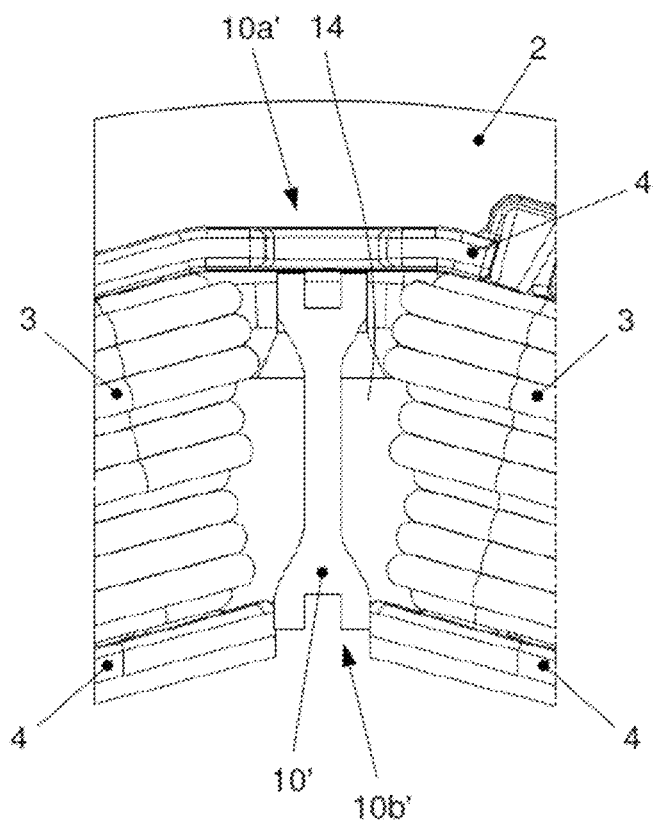
Figure 18B:
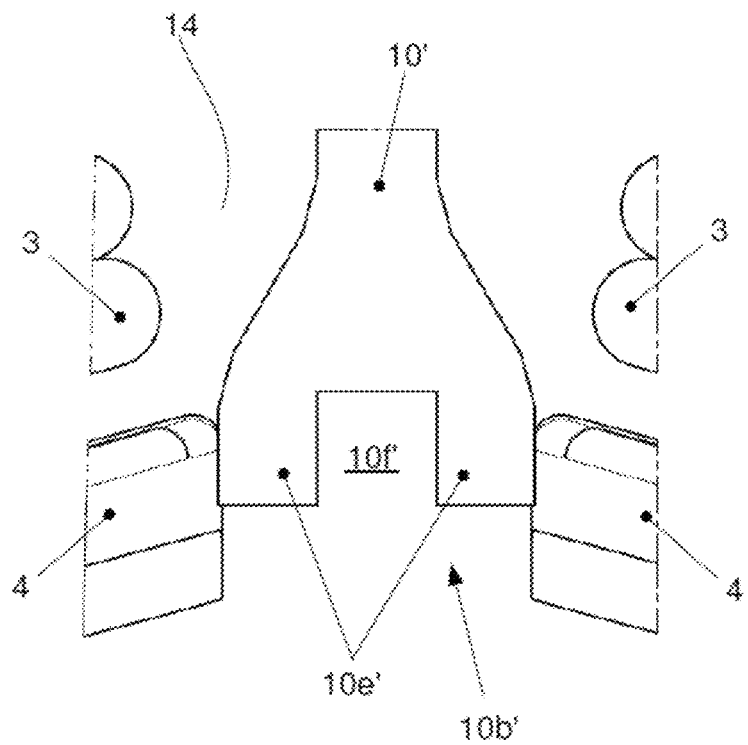

FIGS. 8A and 8B as well as FIGS. 18A and 18B each show an alignment of the first insulation element 4 and a second insulation element 10, 10' of the insulation assembly as relates to the coils 3 in a top view, with a detailed view of the connection between the first insulation element 4 and the second insulation element 10, 10', according to FIG. 8B and FIG. 18B, on an inner radius of the insulation assembly.

While the second insulation element 10, 10', which is retained within the mounting element 13, 13' on the cover element 6, fits closely with the first insulation element 4, with the first longitudinal side 10a, 10a', as previously explained regarding FIG. 7B and/or FIG. 17B, the second insulation element 10, 10' fits closely with the bars of the stator core 2, with the second longitudinal side 10b, 10b', said bars likewise being covered by the first insulation element 4 in the contact area. In this case, the second insulation element 10, 10' is connected to the first insulation element 4 in the area of minimal expansion of the intermediate space 14, at the end faces of the bars of the stator core 2, at a second respective bar 10e, 10e'.

According to the first exemplary embodiment of the invention according to FIG. 8B, the second bars 10e are aligned with respect to one another at a certain angle α, particularly an angle α in a range between 50° and 70°, especially 60°.

The grooves 10g, which are formed at the end faces of the second bars 10e, are arranged encompassing an edge of the bar of the stator core 2, said edge being aligned in the longitudinal direction, to the extent that the second insulation element 10 is incorporated, particularly pressed, on the first longitudinal side 10a within the mounting element 13 of the cover element 6 and is latched to the first insulation element 4 on the longitudinal side 10b with two tongue-and-groove-type connections. Thus, the second insulation element 10 is affixed to the first insulation element 4.

According to the second exemplary embodiment of the invention according to FIG. 18B, the second insulation elements 10', which are arranged between the adjacent bars of the stator core 2, fit flush with the inner surfaces of the bars of the stator core 2, with outer surfaces of the second bars 10e'. The second recess 10f', which is formed between the second bars 10e', enables the second bars 10e' to be pressed together in the circumferential direction of the stator 1' to the extent that the second insulation element 10' is arranged within the bars of the stator core 2, particularly between the first insulation element 4, which is formed in these areas, pressed in an elastically deforming manner. Thus, the second insulation element 10' is incorporated, particularly pressed, on the first longitudinal side 10a' within the mounting element 13' of the cover element 6, on the one hand, and along the second longitudinal side 10b' between the bars of the stator core 2, on the other hand, and connected to the first insulation element 4. The second insulation element 10' is affixed to the first insulation element 4 along the longitudinal sides 10a', 10b'.

In order to ensure a sufficient press fit within the intermediate space 14, particularly within the mounting element 13, 13' as well as on the first insulation element 4, the second insulation elements 10, 10' each have a certain excess dimension. The respective press fits ensure that the second insulation elements 10, 10' are not moved or pushed from the intended position after the placement on the first insulation element 4 during the further assembly of the stator 1, 1' and/or of the electric motor or of the compressor as well as during operation of the compressor.

The intermediate spaces 14, which are formed between adjacent coils 3, are each divided into two separate volumes by a second insulation element 10, 10'.

Figure 9A:
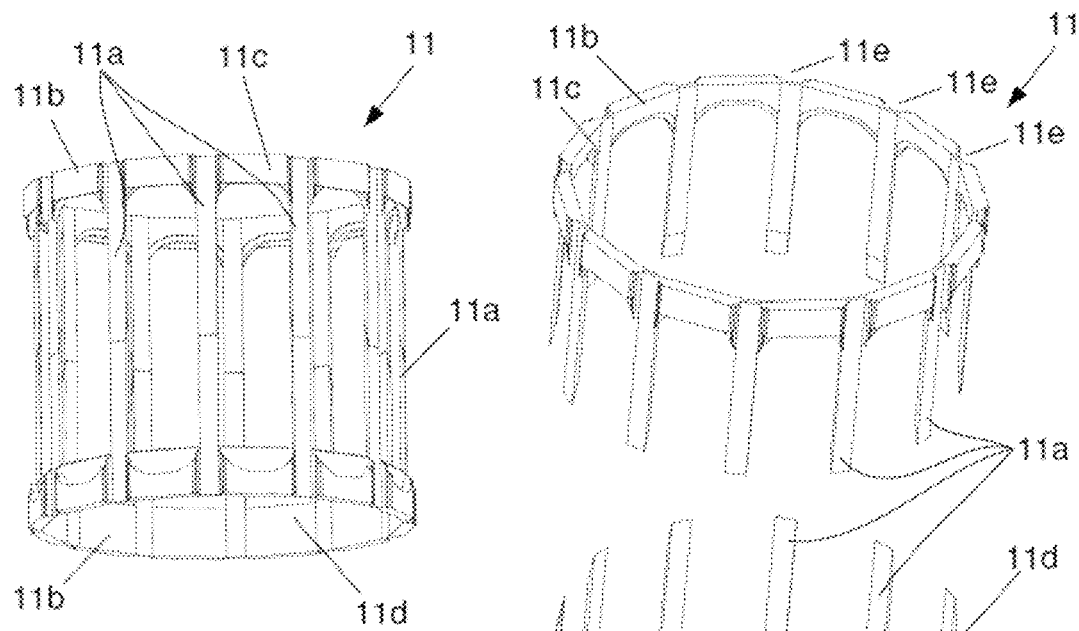
Figure 9B:
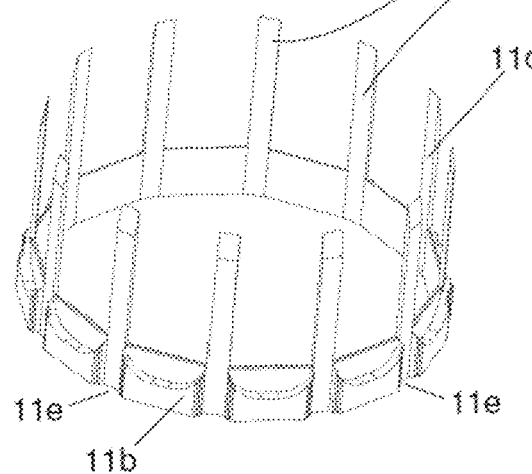
Figure 9C:
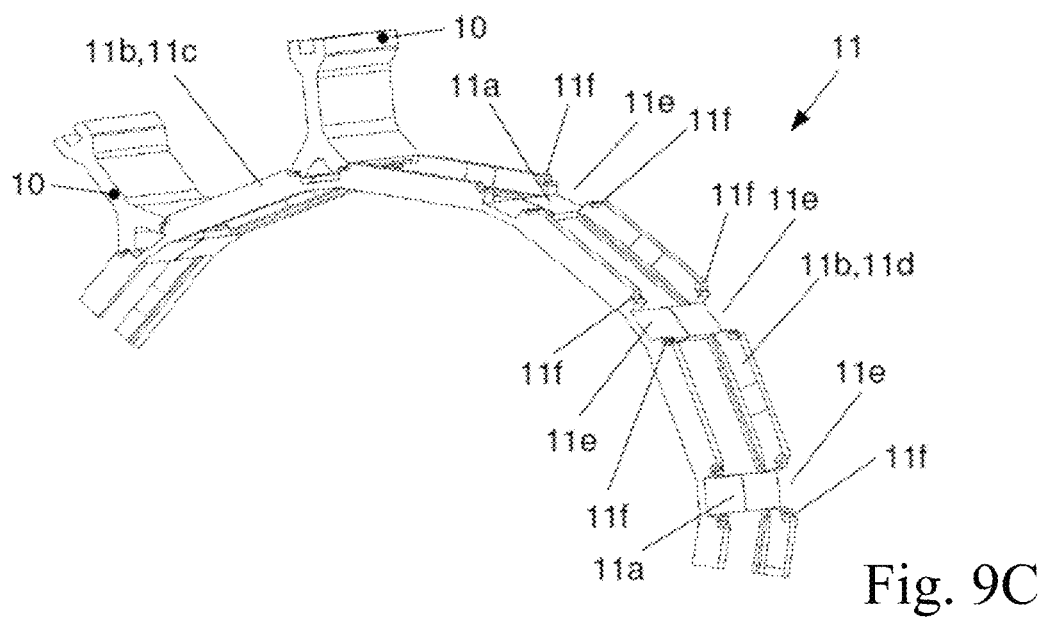

FIGS. 9A to 9C and FIGS. 19A to 19C each show the third insulation element 11, 11' with a first sub-element 11c and a second sub-element 11d as assembled, according to FIGS. 9A and 9C or FIGS. 19A and 19C, and in an exploded view, according to FIG. 9B or FIG. 19B, each in a perspective view. FIG. 9C additionally shows an assembly of two insulation elements 10 on the third insulation element 11.

The third insulation element 11, 11', which has the shape of a round cage with braces 11a, also characterized as longitudinal connectors 11a, extending in the axial direction, which are connected to one another at the first and second ends via a closed ring 11b, depicts the overall shape of the passages formed and remaining on an inner side of the stator 1, 1'. Thus, just as the second insulation elements 10, 10', the axially aligned longitudinal connectors 11a serve to seal off the intermediate spaces 14 formed between the bars and/or the coils 3, on the end faces of the bars of the stator core 2, said end faces pointing inward in the radial direction. On the one hand, the rings 11b arranged at ends, aligned distally to one another, of the longitudinal connectors 11a complete the sealing of the inner side of the stator 1, 1' with respect to the rotor. On the other hand, the longitudinal connectors 11a are retained in specified positions with the rings 11b.

The first sub-element 11c and the second sub-element 11d of the third insulation element 11, 11' are formed in a corresponding and connectable manner. In this case, the braces 11a can each be provided with latching devices at free ends, which are arranged aligned with one another, said latching devices being connectable to one another in an interlocking manner.

The third insulation element 11, 11' has recesses 11e in the area of the rings 11b, said recesses being arranged uniformly distributed on the circumference on an outer side of the rings 11b. The recesses 11e are each formed in an extension of a longitudinal connector 11a, essentially having the width of the longitudinal connector 11a. The recess 11e, which extends from the outer side of the ring 11b in the direction of the inner side as well as in the circumferential direction of the ring 11b, should be understood in this case to be a reduction in the wall thickness of the third insulation element 11, 11'. The wall thickness of the ring 11b corresponds to the wall thickness of a longitudinal connector 11a, each in the radial direction, in the area of the recess 11e.

The recess 11e is additionally formed to taper in the direction of the inner side of the ring 11b and has an indent 11f in the area of the transition from the reduced to the maximum wall thickness of the ring 11b, according to the first exemplary embodiment of the invention according to FIG. 9C.

Figure 10A:
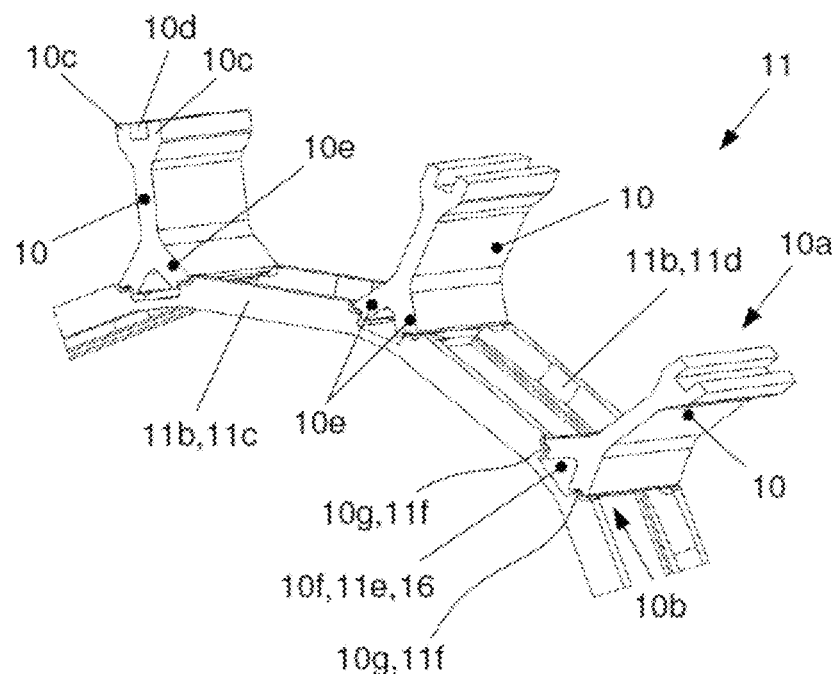
Figure 10B:
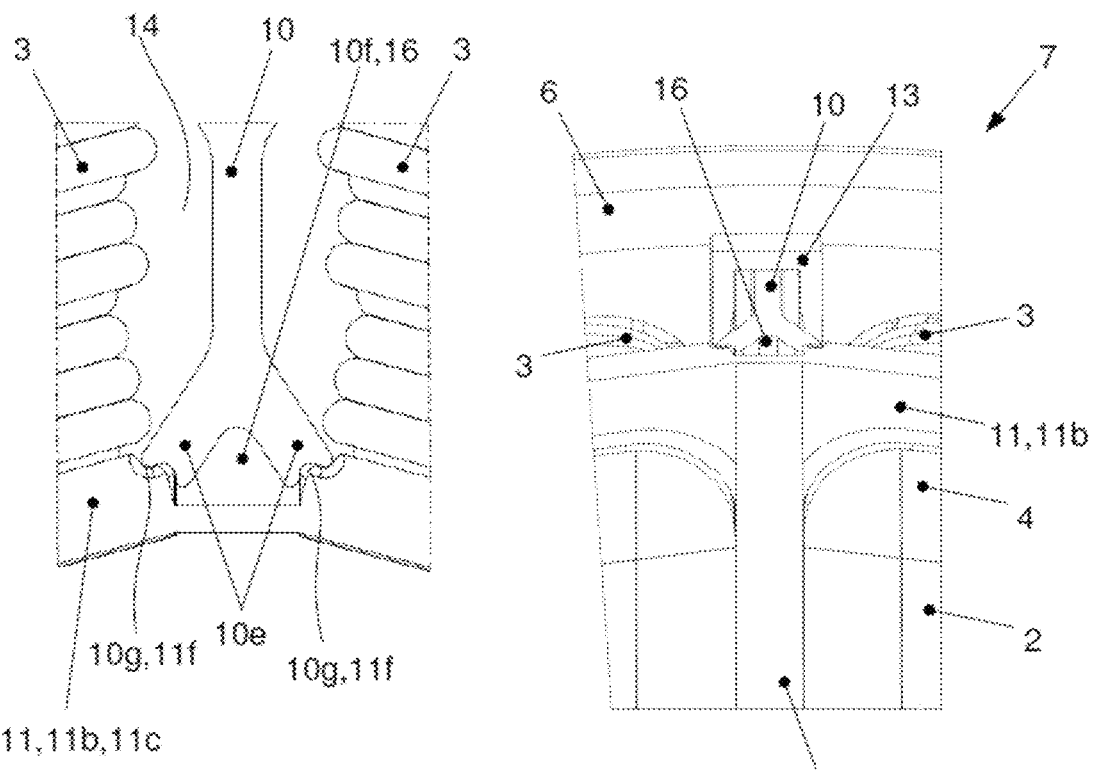
Figure 10C:
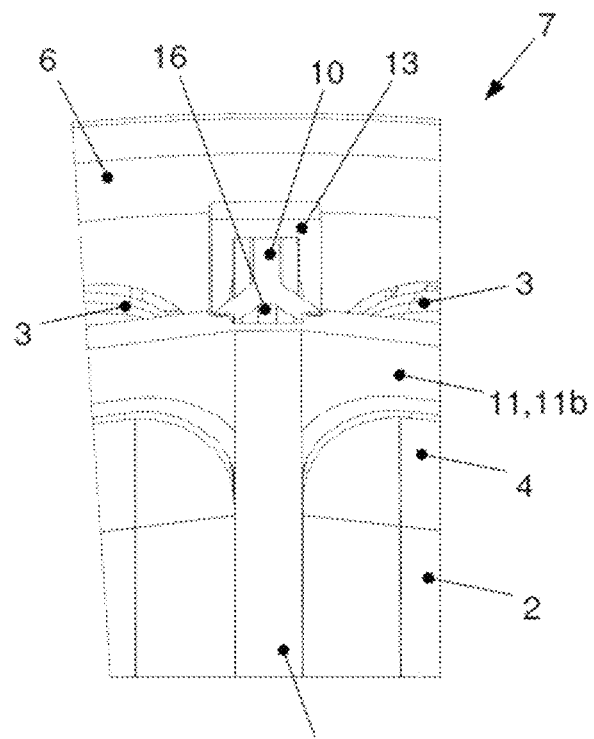
Figure 10D:
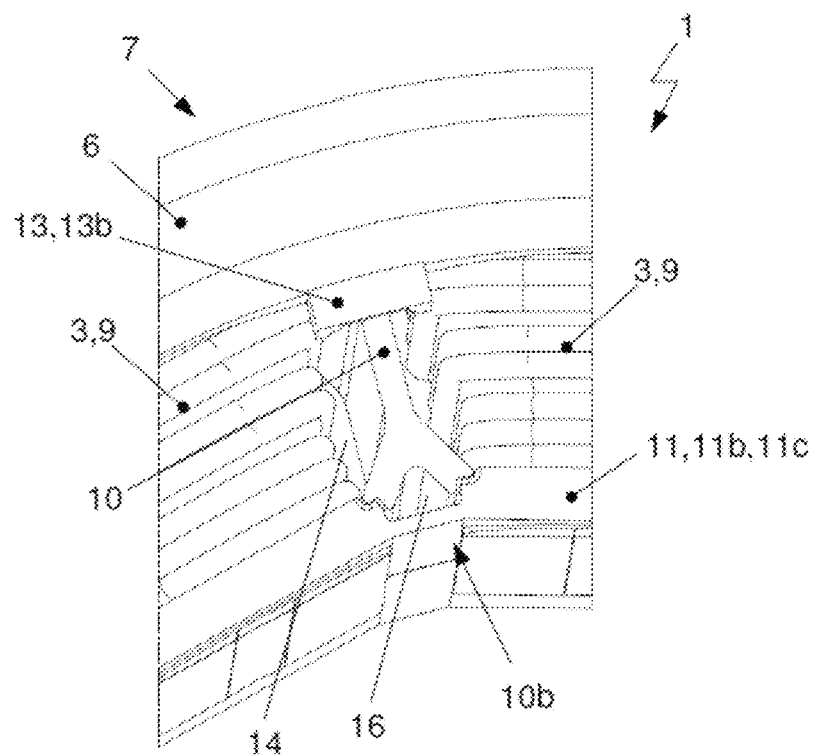
FIG. 10D and FIG. 20D: each show an assembly comprising a cover element with mounting element as well as a second and the third insulation element of the insulation assembly as relates to the coils, in a top view of the first end face of the stator and a detailed view.
Figure 10E:
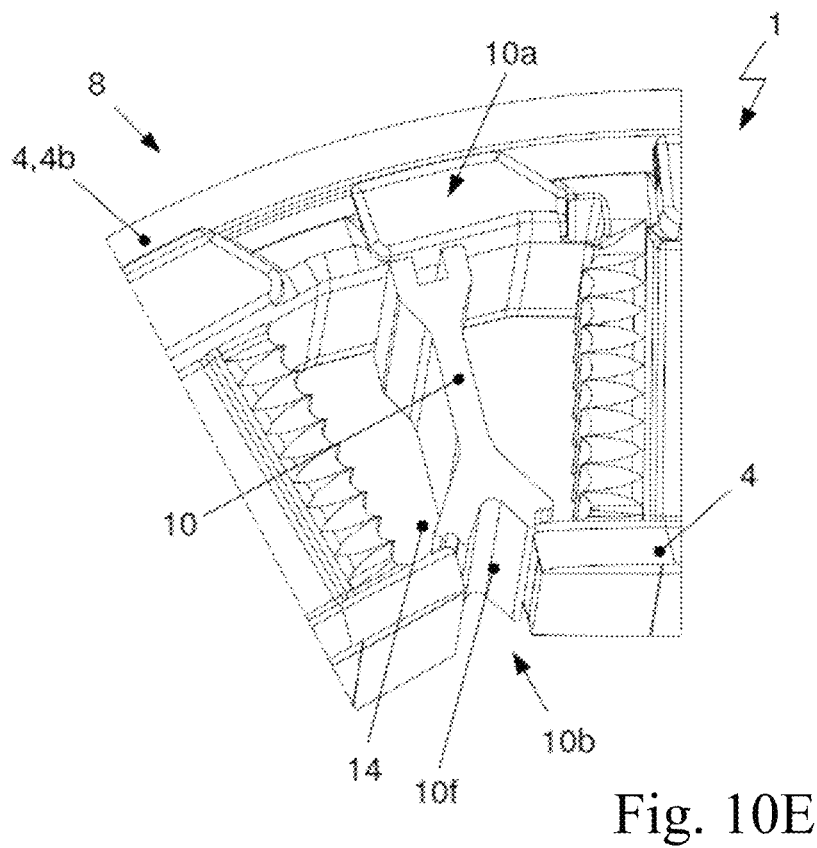
FIG. 10E and FIG. 20E: each show an assembly comprising the first and a second insulation element of the insulation assembly, in a top view of the second end face of the stator and detailed view.
Figure 20D:
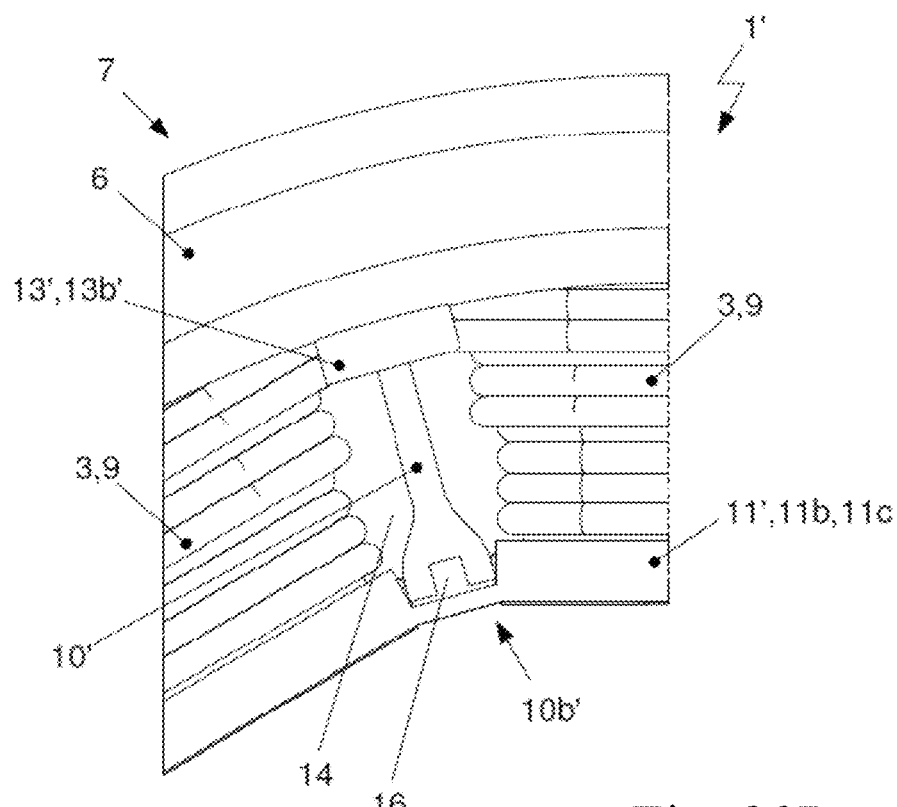
Figure 20E:
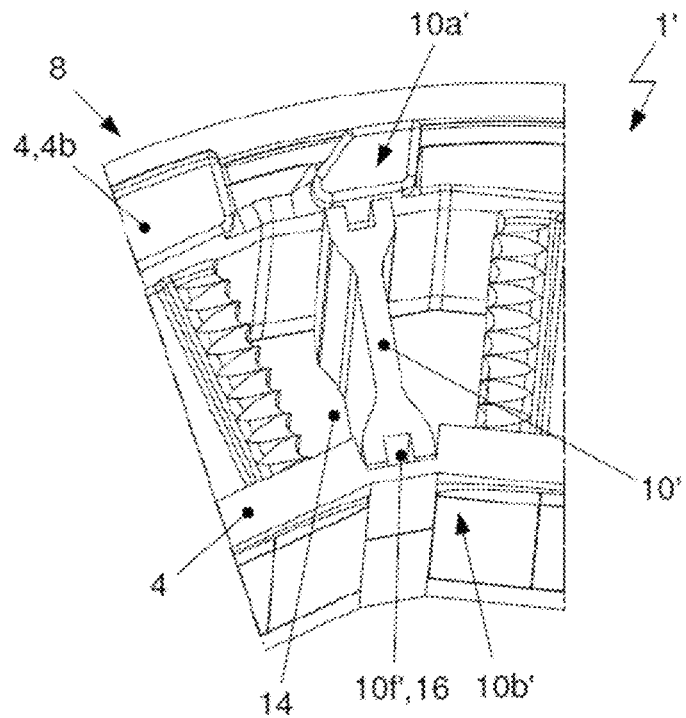

FIG. 10A and FIG. 20A each show an assembly of two insulation elements 10, 10' on the third insulation element 11, 11' as a detailed view of an end face of the third insulation element 11, 11', in a perspective view, while FIG. 10B and FIG. 20B each show a connection between a second insulation element 10, 10' and the third insulation element 11, 11' on the inner radius of the insulation assembly, in a detailed view in a top view, and FIGS. 10C and 10D as well as FIGS. 20C and 20D each show the assembly of a second insulation element 10, 10' between the cover element 6 and the third insulation element 11, 11' and/or an alignment of the cover element 6 as well as the first insulation element 4, a second insulation element 10, 10', and the third insulation element 11, 11' of the insulation assembly as relates to the coils 3, in a perspective, detailed view and a top view. Thus, FIG. 10D and FIG. 20D each show an assembly comprising the cover element 6 with the mounting element 13, 13' as well as a second insulation element 10, 10' and the third insulation element 11, 11' of the insulation assembly as relates to the conducting wires 9 wound into coils 3, in a top view of the first end face 7 of the stator 1, 1'. FIG. 10E and FIG. 20E each show an assembly comprising the first insulation element 4 and a second insulation element 10, 10' of the insulation assembly, in a top view of the second end face 8 of the stator 1, 1', in a detailed view.

According to the first exemplary embodiment of the invention according to FIGS. 10A to 10E, the second insulation elements 10 are each arranged on the third insulation element 11 in the area of a recess 11e as well as of a longitudinal connector 11a. In this case, the second insulation elements 10 fit closely with a longitudinal connector 11a, with the second longitudinal side 10b, in the axial direction, and fit closely with an indent 11f of a recess 11e of the ring 11b, with a groove 10g of a second bar 10e, forming a second cavity 16 on the third insulation element 11. The groove 10g of the second bar 10e and the indent 11f of the recess 11e of the ring 11b are formed with shapes corresponding to one another.

According to the second exemplary embodiment of the invention according to FIGS. 20A to 20E, the second insulation elements 10' are each arranged on the third insulation element 11' within a recess 11e as well as in the area of a longitudinal connector 11a. In this case, the second insulation elements 10' fit closely with a longitudinal connector 11a, with the second longitudinal side 10b', in the axial direction, and fits closely with a base area of a recess 11e of the ring 11b, with an end face of a second bar 10e', forming a second cavity 16 on the third insulation element 11'.

The second cavity 16 between a second insulation element 10, 10' and the third insulation element 11, 11' is delimited respectively by the second bars 10e, 10e' of the second insulation element 10, 10' and the longitudinal connectors 11a and delimited in the area of the rings 11b by the wall of the ring 11b in the area of the recess 11e. Thus, the second cavity 16, which also extends in the axial direction, and which results from the second recess 10f, 10f' of the second insulation element 10, 10' and the recess 11e of the third insulation element 11, 11', is completely closed and only open on the end aligned in the direction of the end faces 7, 8 of the stator 1, 1'.

The second cavities 16 can be filled or potted with a suitable potting material 12.

An additional cemented or potted connection or several additional cemented or potted connections are produced between respectively adjacently arranged components upon potting of the cavities 15, 16 with a potting material 12, such as a suitable epoxy resin or adhesive, particularly in order to extend the creepage paths between electrically conductive elements to a minimum dimension. Thus, a complete hermetic sealing of potential creepage areas from the conducting wire 9 is achieved, inter alia, within the end face of the bars of the stator core 2.

The insulation assembly ensures the required insulation distances and insulation resistances between electrically conductive elements, such as the conducting wires 9, particularly the coils 3 or the magnetically inactive sections, or even to the stator core 2 and/or to the housing of the electric motor, with an increased creepage path, as a function of the voltage level.

LIST OF REFERENCE NUMERALS 1, 1' Stator
2 Stator core
3 Coil
4 First insulation element
4a First area
4b Second area
5 Longitudinal axis
6 Cover element
6a First axial ring surface, outer wall
6b Radial ring surface
6c Second axial ring surface, inner wall
7 First end face
8 Second end face
9 Conducting wire
10, 10' Second insulation element
10a, 10a' First longitudinal side of the second insulation element 10, 10'
10b, 10b' Second longitudinal side of the second insulation element 10, 10'
10c, 10c' First bar of the second insulation element 10, 10'
10d, 10d' First recess of the second insulation element 10, 10'
10e, 10e' Second bar of the second insulation element 10, 10'
10f, 10f' Second recess of the second insulation element 10, 10'
10g Groove of the second insulation element 10
11, 11' Third insulation element
11a Brace, longitudinal connector of the third insulation element 11, 11'
11b Ring of the third insulation element 11, 11'
11c First sub-element of the third insulation element 11, 11'
11d Second sub-element of the third insulation element 11, 11'
11e Recess of the third insulation element 11, 11'
11f Indent, recess of the third insulation element 11
12 Potting material
13, 13' Mounting element
13a, 13a' First wall, mounting element 13, 13'
13b, 13b' Second wall, mounting element 13, 13'
13c, 13c' Indent
14 Intermediate space
15 First cavity
16 Second cavity

What is claimed is:

1. A device for driving a compressor of a vaporous fluid, particularly an electric motor, the device comprising:
a rotor and a stator with a stator core as well as an insulation assembly, which are arranged extending along a common longitudinal axis from a first end face to a second end face of the stator, wherein the stator core is formed with bars uniformly arranged on a circumference for accommodating conducting wires wound into coils, and the insulation assembly has at least one first insulation element, second insulation elements, and at least one third insulation element, wherein the at least one first insulation element is arranged between the conducting wires and the stator core, a respective one of the second insulation elements is arranged in an intermediate space formed between the coils arranged adjacent to one another; and the at least one third insulation element is arranged on an inner side of the stator, the inner side pointing inward in a radial direction in a manner so as to seal the inner side, wherein each of the second insulation elements, which extends continuously in an axial direction between the first end face and the second end face of the stator, has a first longitudinal side and a second longitudinal side extending in the axial direction and aligned in the radial direction, and wherein each of the second insulation elements is arranged to fit closely with the at least one first insulation element with the second longitudinal side aligned radially inward in the area between the end faces of the bars of the stator core, which seal off the intermediate space in the axial direction.

2. The device according to claim 1, wherein the intermediate space respectively formed between two of the bars arranged adjacent to one another, with the at least one first insulation element shaped about the bars, is open inward in the radial direction, wherein the intermediate space has minimal expansion in an area between end faces of the bars.

3. The device according to claim 1, wherein each of the second insulation elements is aligned with the first longitudinal side radially outward and arranged to fit closely continuously with a base area of the intermediate space, on the at least one first insulation element.

4. A device for driving a compressor of a vaporous fluid, particularly an electric motor, the device comprising:
a rotor and a stator with a stator core as well as an insulation assembly, which are arranged extending along a common longitudinal axis from a first end face to a second end face of the stator, wherein the stator core is formed with bars uniformly arranged on a circumference for accommodating conducting wires wound into coils, and the insulation assembly has at least one first insulation element, second insulation elements, and at least one third insulation element, wherein the at least one first insulation element is arranged between the conducting wires and the stator core, a respective one of the second insulation elements is arranged in an intermediate space formed between the coils arranged adjacent to one another, and the at least one third insulation element is arranged on an inner side of the stator, the inner side pointing inward in a radial direction in a manner so as to seal the inner side, wherein each of the second insulation elements, which extends continuously in an axial direction between the first end face and the second end face of the stator, has a first longitudinal side and a second longitudinal side extending in the axial direction and aligned in the radial direction, and wherein each of the second insulation elements has a U-shaped cross-section with two of the bars, which delimit a recess, perpendicular to a longitudinal direction in an area of the first longitudinal side.

5. The device according to claim 4, wherein each of the second insulation elements fits closely with the at least one first insulation element, with the two of the bars, in the axial direction, forming a first cavity.

6. A device for driving a compressor of a vaporous fluid, particularly an electric motor, the device comprising:
a rotor and a stator with a stator core as well as an insulation assembly, which are arranged extending along a common longitudinal axis from a first end face to a second end face of the stator, wherein the stator core is formed with bars uniformly arranged on a circumference for accommodating conducting wires wound into coils, and the insulation assembly has at least one first insulation element, second insulation elements, and at least one third insulation element, wherein the at least one first insulation element is arranged between the conducting wires and the stator core, a respective one of the second insulation elements is arranged in an intermediate space formed between the coils arranged adjacent to one another, and the at least one third insulation element is arranged on an inner side of the stator, the inner side pointing inward in a radial direction in a manner so as to seal the inner side, wherein each of the second insulation elements, which extends continuously in an axial direction between the first end face and the second end face of the stator, has a first longitudinal side and a second longitudinal side extending in the axial direction and aligned in the radial direction, and wherein each of the second insulation elements has a Y-shaped cross-section with two of the bars, which delimit a recess, perpendicular to a longitudinal direction in an area of the second longitudinal side.

7. The device according to claim 6, wherein grooves aligned in the longitudinal direction are formed at free end faces arranged aligned with respect to the second longitudinal side of the second insulation element, of the two of the bars.

8. A device for driving a compressor of a vaporous fluid, particularly an electric motor, the device comprising:
a rotor and a stator with a stator core as well as an insulation assembly, which are arranged extending along a common longitudinal axis from a first end face to a second end face of the stator, wherein the stator core is formed with bars uniformly arranged on a circumference for accommodating conducting wires wound into coils, and the insulation assembly has at least one first insulation element, second insulation elements, and at least one third insulation element, wherein the at least one first insulation element is arranged between the conducting wires and the stator core, a respective one of the second insulation elements is arranged in an intermediate space formed between the coils arranged adjacent to one another; and the at least one third insulation element is arranged on an inner side of the stator, the inner side pointing inward in a radial direction in a manner so as to seal the inner side, wherein each of the second insulation elements, which extends continuously in an axial direction between the first end face and the second end face of the stator, has a first longitudinal side and a second longitudinal side extending in the axial direction and aligned in the radial direction, and wherein each of the second insulation elements has a U-shaped cross-section with two of the bars, which delimit a recess, perpendicular to a longitudinal direction in an area of the second longitudinal side.

9. A device for driving a compressor of a vaporous fluid, particularly an electric motor, the device comprising:
a rotor and a stator with a stator core as well as an insulation assembly, which are arranged extending along a common longitudinal axis from a first end face to a second end face of the stator, wherein the stator core is formed with bars uniformly arranged on a circumference for accommodating conducting wires wound into coils, and the insulation assembly has at least one first insulation element, second insulation elements, and at least one third insulation element, wherein the at least one first insulation element is arranged between the conducting wires and the stator core, a respective one of the second insulation elements is arranged in an intermediate space formed between the coils arranged adjacent to one another; and the at least one third insulation element is arranged on an inner side of the stator, the inner side pointing inward in a radial direction in a manner so as to seal the inner side, wherein the at least one third insulation element has a shape of a cylindrical cage with braces extending in an axial direction, which are connected to one another at first and second ends, respectively, via an entirely closed ring, and wherein the at least one third insulation element has recesses arranged uniformly distributed on a circumference in an area of the closed ring, the recesses being respectively formed on an outer side of the closed ring.

10. The device according to claim 9, wherein the recesses are respectively formed in an extension of a brace arranged in the axial direction.

11. The device according to claim 10, wherein one of the second insulation elements fits closely with the brace of the at least one third insulation element, with a longitudinal side, in the axial direction, and fits closely with an indent of a recess of a ring, with a groove of one of the bars, forming a cavity on the at least one third insulation element.

12. The device according to claim 11, wherein the cavity is completely closed, the cavity being formed on a recess between the one of the second insulation elements and the at least one third insulation element by means of the one of the bars of the second insulation element and by means of the brace of the at least one third insulation element as well as in the area of the closed ring of the third insulation element by means of the wall of the closed ring.

13. The device according to claim 10, wherein one of the second insulation elements fits closely with the brace of the at least one third insulation element, with a longitudinal side, in the axial direction, and fits closely with a base area of a recess of a ring, forming a cavity on the at least one third insulation element.

14. The device according to claim 9, wherein the second insulation elements fit closely with the at least one third insulation element in an area of a recess as well as of a brace of the at least one third insulation element.

15. A device for driving a compressor of a vaporous fluid, particularly an electric motor, the device comprising:
a rotor and a stator with a stator core as well as an insulation assembly, which are arranged extending along a common longitudinal axis from a first end face to a second end face of the stator, wherein the stator core is formed with bars uniformly arranged on a circumference for accommodating conducting wires wound into coils, and the insulation assembly has at least one first insulation element, second insulation elements, and at least one third insulation element, wherein the at least one first insulation element is arranged between the conducting wires and the stator core, a respective one of the second insulation elements is arranged in an intermediate space formed between the coils arranged adjacent to one another; and the at least one third insulation element is arranged on an inner side of the stator, the inner side pointing inward in a radial direction in a manner so as to seal the inner side, wherein the first insulation element is formed protruding over the stator core at least at one of the first end face and the second end face of the stator, and an area of the first insulation element protruding from the stator core in an axial direction at the one of the first end face and the second end face of the stator is formed as a substantially cylindrical wall for connecting to a cover element, wherein the cover element is formed as a completely closed ring with a first axially aligned ring surface, a radially aligned ring surface, as well as a second axially aligned ring surface, wherein the second axially aligned ring surface of the cover element is provided as an inner wall with mounting elements arranged distributed uniformly about a circumference for holding a respective one of the second insulation elements.

16. The device according to claim 15, wherein the first axially aligned ring surface formed on an outer radius of the cover element and the second axially aligned ring surface formed on an inner radius of the cover element are aligned parallel to one another and connected to one another via the radially aligned ring surface.

17. The device according to claim 15, wherein the mounting elements are formed as openings within the second axially aligned ring surface.

18. The device according to claim 17, wherein the openings of the mounting elements are formed with first walls and one second wall protruding from the second axially aligned ring surface inward in a radial direction.

19. The device according to claim 15, wherein the mounting elements are formed with first walls and one second wall protruding from the second axially aligned ring surface inward in a radial direction.

20. The device according to claim 19, wherein the first walls and the one second wall have a U-shape in cross-section, wherein the first walls are arranged as legs of the U-shape, aligned in the axial direction, and the one second wall is arranged in a manner so as to connect the first walls, aligned in a circumferential direction of the cover element.

21. The device according to claim 20, wherein the second insulation elements are arranged in an area pointing toward the first end face of the stator as well as forming a first longitudinal side, which is aligned in the axial direction, the second insulation elements protruding into the U-shape marked by the first walls and the one second wall.

22. The device according to claim 21, wherein the second insulation elements within the mounting elements are arranged flush with inner surfaces of the first walls of the mounting elements, with outer surfaces of one of the bars, wherein the second insulation elements are incorporated within the mounting elements.

* * * * *